United States Patent
Kim et al.

(10) Patent No.: US 12,361,270 B2
(45) Date of Patent: Jul. 15, 2025

(54) NEURAL CORE, NEURAL PROCESSING DEVICE INCLUDING SAME, AND METHOD FOR LOADING DATA OF NEURAL PROCESSING DEVICE

(71) Applicant: Rebellions Inc., Seongnam-si (KR)

(72) Inventors: Jinseok Kim, Seongnam-si (KR); Kyeongryeol Bong, Seongnam-si (KR); Jinwook Oh, Seongnam-si (KR); Yoonho Boo, Seongnam-si (KR)

(73) Assignee: Rebellions Inc., Seongnam-si (KR)

( * ) Notice: Subject to any disclaimer, the term of this patent is extended or adjusted under 35 U.S.C. 154(b) by 0 days.

(21) Appl. No.: 18/597,728

(22) Filed: Mar. 6, 2024

(65) Prior Publication Data

US 2024/0211742 A1    Jun. 27, 2024

Related U.S. Application Data

(63) Continuation of application No. 18/322,519, filed on May 23, 2023, now Pat. No. 11,954,584.

(30) Foreign Application Priority Data

Jul. 8, 2022    (KR) .................. 10-2022-0084478

(51) Int. Cl.
  *G06N 3/063*    (2023.01)
  *G06F 9/54*     (2006.01)
  *G06F 12/084*   (2016.01)

(52) U.S. Cl.
  CPC ............. *G06N 3/063* (2013.01); *G06F 9/544* (2013.01); *G06F 12/084* (2013.01)

(58) Field of Classification Search
  CPC .......... G06N 3/063; G06N 3/02; G06N 20/00; G06F 9/544; G06F 12/084; G06F 2212/251

(Continued)

(56) References Cited

U.S. PATENT DOCUMENTS 10,073,817 B1    9/2018  Patil et al.
2003/0002474 A1*  1/2003  Alexander .............. H04J 3/047
                                                370/535

(Continued)

FOREIGN PATENT DOCUMENTS

KR    10-2258566 B1    6/2021
WO    2020/084694 A1   4/2020

OTHER PUBLICATIONS

Office Action for KR 10-2022-0084478 by Korean Intellectual Property Office dated Jul. 15, 2024.

*Primary Examiner* — Hashem Farrokh

(74) *Attorney, Agent, or Firm* — BROADVIEW IP LAW, PC

(57) ABSTRACT

A neural core, a neural processing device including same and a method for lauding data of a neural processing device are provided. The neural core comprises a processing unit configured to perform operations, an L0 memory configured to store input data and an LSU configured to perform a load task and a store task of data between the processing unit and the L0 memory, wherein the LSU comprises a local memory load unit configured to transmit the input data in the L0 memory to the processing unit, and the local memory load unit comprises a target decision module configured to identify and retrieve the input data in the L0 memory, a transformation logic configured to transform the input data and thereby generate transformed data and an output FIFO configured to receive the transformed data and transmit the transformed data to the processing unit in the received order.

12 Claims, 28 Drawing Sheets

(58) Field of Classification Search
USPC .......................................................... 711/147
See application file for complete search history.

(56) References Cited

U.S. PATENT DOCUMENTS

| | | | |
|---|---|---|---|
| 2018/0232627 A1* | 8/2018 | Rozen | G06N 3/063 |
| 2018/0299943 A1* | 10/2018 | McBride | H03M 7/6011 |
| 2020/0310794 A1* | 10/2020 | Sperber | G06F 9/3854 |
| 2021/0034958 A1* | 2/2021 | Sinha | G06N 3/045 |
| 2021/0042260 A1* | 2/2021 | Reinhardt | G06F 9/3001 |
| 2022/0043657 A1* | 2/2022 | Gupta | G06F 9/38 |
| 2023/0120516 A1* | 4/2023 | Weber | G06N 3/044 |
| | | | 706/26 |
| 2023/0144662 A1* | 5/2023 | Tasinga | G06F 9/5088 |
| | | | 718/105 |

* cited by examiner

NEURAL CORE, NEURAL PROCESSING DEVICE INCLUDING SAME, AND METHOD FOR LOADING DATA OF NEURAL PROCESSING DEVICE

CROSS-REFERENCE TO RELATED APPLICATION

This application is a continuation of U.S. Ser. No. 18/322,519, filed on May 23, 2023, which claims priority under 35 U.S.C § 119 to Korean Patent Application No. 10-2022-0084478 filed on Jul. 8, 2022, in the Korean Intellectual Property Office, the entire contents of which is hereby incorporated by reference.

TECHNICAL FIELD

The disclosure relates to a neural core, a neural processing device including the same, and a method for loading data of the neural processing device. More particularly, the disclosure relates to a neural core, a neural processing device including the same, and a method for loading data of the neural processing device, which are capable of executing instructions of high utilization during data loading.

BACKGROUND

For the last few years, artificial intelligence technology has been the core technology of the Fourth Industrial Revolution and the subject of discussion as the most promising technology worldwide. The biggest problem with artificial intelligence technology is computing performance. For artificial intelligence technology to realize a level of human learning ability, reasoning ability, perceptual ability, natural language implementation ability, etc., it is of the utmost importance to process a large amount of data quickly.

The central processing unit (CPU) or graphics processing unit (GPU) of off-the-shelf computers was used to implement deep-learning training and inference in early artificial intelligence, but these components had limitations in their ability to perform the tasks of deep-learning training and inference with high workloads. Thus, neural processing units (NPUs) that are structurally specialized for deep learning tasks have received a lot of attention.

In particular, data are frequently loaded in the deep-learning training and inference of such a neural processing unit, and a lot of time and resources may be allocated to such a load task. Therefore, various methods for improving the efficiency of a load task are being discussed.

The description set forth in the background section should not be assumed to be prior art merely because it is set forth in the background section. The background section may describe aspects or embodiments of the disclosure.

SUMMARY

Aspects of the disclosure provide a neural core capable of performing frequently used operations during a data loading process.

Aspects of the disclosure provide a neural processing device capable of performing frequently used operations during a data loading process.

Aspects of the disclosure provide a method for loading data of a neural processing device capable of performing frequently used operations during a data loading process.

According to some aspects of the disclosure, a neural core comprises a processing unit configured to perform operations, an L0 memory configured to store input data and a load/store unit (LSU) configured to perform a load task and a store task of data between the processing unit and the L0 memory, wherein the LSU comprises a local memory load unit configured to transmit the input data in the L0 memory to the processing unit, and the local memory load unit comprises a target decision module configured to identify and retrieve the input data in the L0 memory, a transformation logic configured to transform the input data and thereby generate transformed data and an output first in first out (FIFO) configured to receive the transformed data and transmit the transformed data to the processing unit in the received order.

According to some aspects, the local memory load unit further comprises a tensor register file configured to receive the input data from the target decision module, provide the input data to the transformation logic, and receive the transformed data from the transformation logic.

According to some aspects, the tensor register file has i entries, and a number of FIFOs of the output FIFO is i.

According to some aspects, the transformation logic performs a merge operation or a shuffle operation, and the transformed data is generated by transforming an order of data granules of the input data by the merge operation or the shuffle operation.

According to some aspects, the transformation logic performs the merge operation, the input data comprises first and second input data, the transformed data comprises first and second transformed data, the first input data comprises first and second data granules of same size each other, the second input data comprises third and fourth data granules of same size each other, the first transformed data comprises the first and third data granules, and the second transformed data comprises the second and fourth data granules.

According to some aspects, the input data has a size of an even multiple of one of the data granules.

According to some aspects, the input data is i times larger than one of the data granules at most, and the processing unit receives i input data simultaneously.

According to some aspects, the transformation logic performs the shuffle operation, the input data comprises first to j-th data granules of same size each other, and the transformed data comprises the first to j-th data granules in a different order from the input data.

According to some aspects, the processing unit receives the i input data simultaneously, and said j is an integer multiple of said i.

According to some aspects, the local memory load unit decodes an instruction and identifies the input data.

According to some aspects, the local memory load unit decodes an instruction and performs any one of a merge operation or a shuffle operation.

According to some aspects of the disclosure, a neural processing device comprises at least one neural processor, a shared memory shared by the at least one neural processor and a global interconnection configured to transmit data between the at least one neural processor and the shared memory, wherein each of the at least one neural processor comprises at least one neural core and an L1 shared memory shared by the at least one neural core, wherein the at least one neural core comprises a processing unit configured to perform operations, an LSU configured to transmit input data to the processing unit, and an L0 memory configured to store the input data, and wherein the LSU transforms the input data into transformed data by a merge operation or a shuffle operation and transfers the transformed data to the processing unit.

According to some aspects, the merge operation is an operation of transforming two pieces of the input data into two pieces of the transformed data.

According to some aspects, the shuffle operation is an operation of transforming one piece of the input data into one piece of the transformed data.

According to some aspects, the LSU performs the merge operation, and the processing unit generates transposed data of the input data with the transformed data.

According to some aspects, the LSU performs the shuffle operation, and the processing unit generates unpacked data of the input data with the transformed data.

According to some aspects of the disclosure, a method for loading data of a neural processing device, comprises receiving a layout transform instruction, storing input data in a tensor register file, generating transformed data by a merge operation or a shuffle operation, storing the transformed data in an output FIFO and transferring the transformed data to a processing unit.

According to some aspects, the method for loading data of the neural processing device further comprises storing the transformed data in the tensor register file after generating the transformed data and transmitting the transformed data stored in the tensor register file to the output FIFO.

According to some aspects, the input data comprises first and second input data, and the transformed data comprises first and second transformed data, and wherein generating the transformed data comprises receiving the first and second input data by the merge operation and generating the first and second transformed data by exchanging portions of each of the first and second input data with each other.

According to some aspects, generating the transformed data comprises generating the transformed data by changing order of the input data by the shuffle operation.

Aspects of the disclosure are not limited to those mentioned above and other objects and advantages of the disclosure that have not been mentioned can be understood by the following description and will be more clearly understood according to embodiments of the disclosure. In addition, it will be readily understood that the objects and advantages of the disclosure can be realized by the means and combinations thereof set forth in the claims.

The neural core, the neural processing device including the same, and the method for loading data of the neural processing device of the disclosure can perform data processing for transpose or unpack that is frequently used in deep-learning tasks during data loading.

In addition, data processing can be performed in conformity with the characteristics of the hardware, thereby exhibiting optimum efficiency.

In addition to the foregoing, the specific effects of the disclosure will be described together while elucidating the specific details for carrying out the embodiments below.

DETAILED DESCRIPTION OF THE PREFERRED EMBODIMENTS

Figure 1:
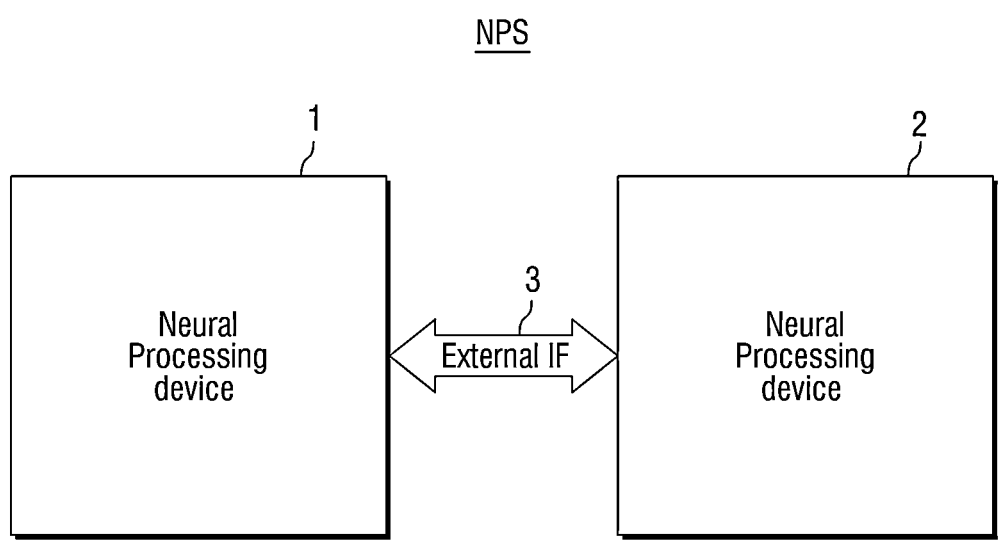
FIG. 1 is a block diagram for illustrating a neural processing system in accordance with some embodiments of the disclosure.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own embodiments in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are used only for the purpose of distinguishing one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular expressions include plural expressions unless the context explicitly indicates otherwise. In the application, terms such as "comprise," "have," "include", "contain," etc. should be understood as not precluding the possibility of existence or addition of features, numbers, steps, operations, components, parts, or combinations thereof described herein. Terms such as a "circuit" or "circuitry", refers to a circuit in hardware but may also refer to a circuit in software.

Unless otherwise defined, the phrases "A, B, or C," "at least one of A, B, or C," or "at least one of A, B, and C" may refer to only A, only B, only C, both A and B, both A and C, both B and C, all of A, B, and C, or any combination thereof.

Unless otherwise defined, all terms used herein, including technical or scientific terms, have the same meaning as commonly understood by those of ordinary skill in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the disclosure.

In addition, each configuration, procedure, process, method, or the like included in each embodiment of the disclosure may be shared to the extent that they are not technically contradictory to each other.

Hereinafter, a neural processing device in accordance with some embodiments of the disclosure will be described with reference to FIGS. 1 to 25.

FIG. 1 is a block diagram illustrating a neural processing system in accordance with some embodiments of the disclosure.

Referring to FIG. 1, a neural processing system NPS in accordance with some embodiments may include a first neural processing device 1, a second neural processing device 2, and an external interface 3.

The first neural processing device 1 may be a device that performs calculations using an artificial neural network. The first neural processing device 1 may be, for example, a device specialized in performing tasks of deep learning calculations. However, the embodiment is not limited thereto.

The second neural processing device 2 may be a device having the same or similar configuration as the first neural processing device 1. The first neural processing device 1 and the second neural processing device 2 may be connected to each other via the external interface 3 and share data and control signals.

Although FIG. 1 shows two neural processing devices, the neural processing system NPS in accordance with some embodiments is not limited thereto. That is, in a neural processing system NPS in accordance with some embodiments, three or more neural processing devices may be connected to each other via the external interface 3. Also, conversely, a neural processing system NPS in accordance with some embodiments may include only one neural processing device.

In this case, the first neural processing device 1 and the second neural processing device 2 may each be a processing device other than the neural processing device. That is, the first neural processing device 1 and the second neural processing device 2 may each be a graphics processing unit (GPU), a central processing unit (CPU), and other types of processing units as well. In the following, the first neural processing device 1 and the second neural processing device 2 will be described as neural processing devices for convenience.

Figure 2:
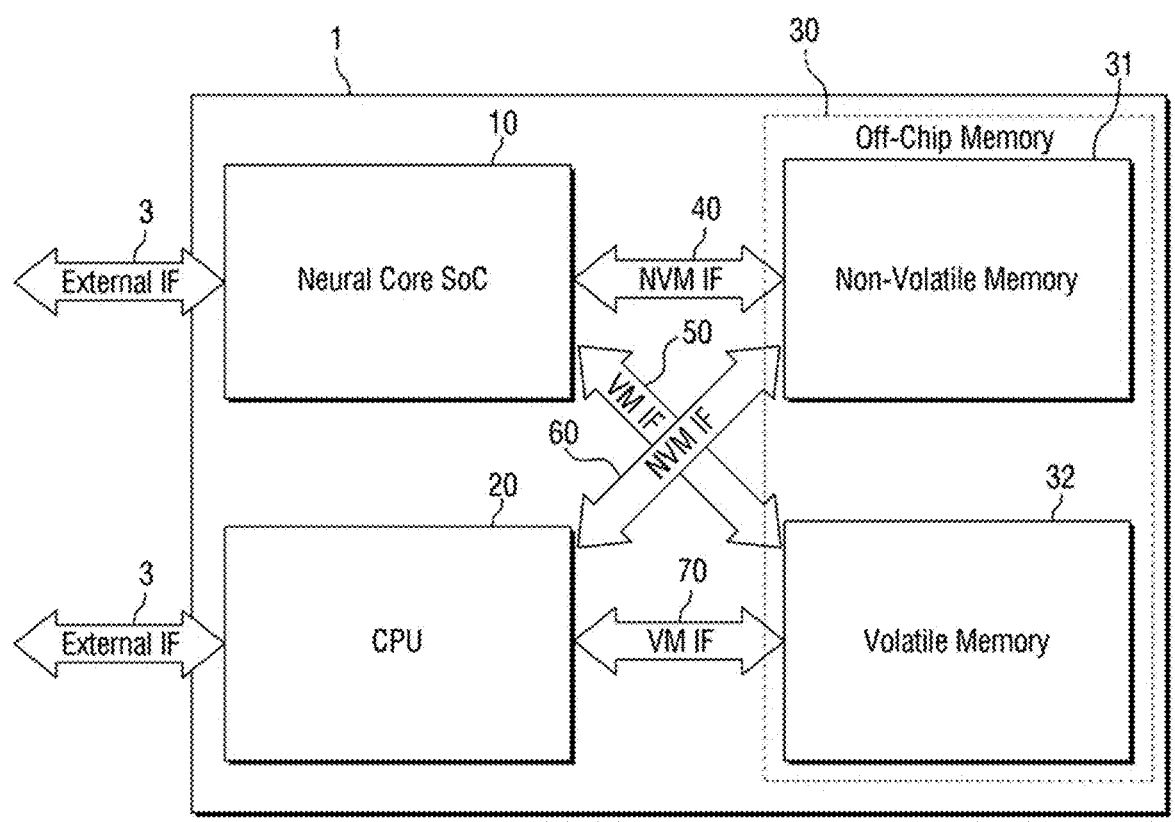
FIG. 2 is a block diagram for illustrating the neural processing device of FIG. 1.

FIG. 2 is a block diagram for illustrating the neural processing device of FIG. 1.

Referring to FIG. 2, a first neural processing device 1 may include a neural core SoC 10, a CPU 20, an off-chip memory 30, a first non-volatile memory interface 40, a first volatile memory interface 50, a second non-volatile memory interface 60, and a second volatile memory interface 70.

The neural core SoC 10 may be a system on a chip device. The neural core SoC 10 can be an artificial intelligence calculation device and may be an accelerator. The neural core SoC 10 may be, for example, any one of a graphics processing unit (GPU), a field-programmable gate array (FPGA), or an application-specific integrated circuit (ASIC). However, the embodiment is not limited thereto.

The neural core SoC 10 may exchange data with other external calculation devices via the external interface 3. Further, the neural core SoC 10 may be connected to the non-volatile memory 31 and the volatile memory 32 via the first non-volatile memory interface 40 and the first volatile memory interface 50, respectively.

The CPU 20 may be a control device that controls the system of the first neural processing device 1 and executes program calculations. The CPU 20 is a general-purpose calculation device and may have low efficiency in performing simple parallel calculations that are frequently used in deep learning. Accordingly, there can be high efficiency by performing calculations in deep learning inference and training tasks by the neural core SoC 10.

The CPU 20 may exchange data with other external calculation units via the external interface 3. Further, the CPU 20 may be connected to the non-volatile memory 31 and the volatile memory 32 via the second non-volatile memory interface 60 and the second volatile memory interface 70, respectively.

The off-chip memory 30 may be a memory disposed outside the chip of the neural core SoC 10. The off-chip memory 30 may include a non-volatile memory 31 and a volatile memory 32.

The non-volatile memory 31 may be a memory that continuously retains stored information even if electric power is not supplied. The non-volatile memory 31 may include, for example, at least one of Read-Only Memory (ROM), Programmable Read-Only Memory (PROM), Erasable Alterable ROM (EAROM), Erasable Programmable Read-Only Memory (EPROM), Electrically Erasable Programmable Read-Only Memory (EEPROM) (e.g., NAND Flash memory, NOR Flash memory), Ultra-Violet Erasable Programmable Read-Only Memory (UVEPROM), Ferroelectric Random-Access Memory (FeRAM), Magnetoresistive Random-Access Memory (MRAM), Phase-change Random-Access Memory (PRAM), silicon-oxide-nitride-oxide-silicon (SONOS), Resistive Random-Access Memory (RRAM), Nanotube Random-Access Memory (NRAM), magnetic computer storage devices (e.g., hard disks, diskette drives, magnetic tapes), optical disc drives, or 3D XPoint memory. However, the embodiment is not limited thereto.

The volatile memory 32 may be a memory that continuously requires electric power to retain stored information, unlike the non-volatile memory 31. The volatile memory 32 may include, for example, at least one of Dynamic Random-Access Memory (DRAM), Static Random-Access Memory (SRAM), Synchronous Dynamic Random-Access Memory (SDRAM), or Double Data Rate SDRAM (DDR SDRAM). However, the embodiment is not limited thereto.

Each of the first non-volatile memory interface 40 and the second non-volatile memory interface 60 may include, for example, at least one of Parallel Advanced Technology Attachment (PATA), Small Computer System Interface (SCSI), Serial Attached SCSI (SAS), Serial Advanced Technology Attachment (SATA), or PCI Express (PCIe). However, the embodiment is not limited thereto.

Each of the first volatile memory interface 50 and the second volatile memory interface 70 may be, for example, at least one of SDR (Single Data Rate), DDR (Double Data Rate), QDR (Quad Data Rate), or XDR (eXtreme Data Rate, Octal Data Rate). However, the embodiment is not limited thereto.

Figure 3:
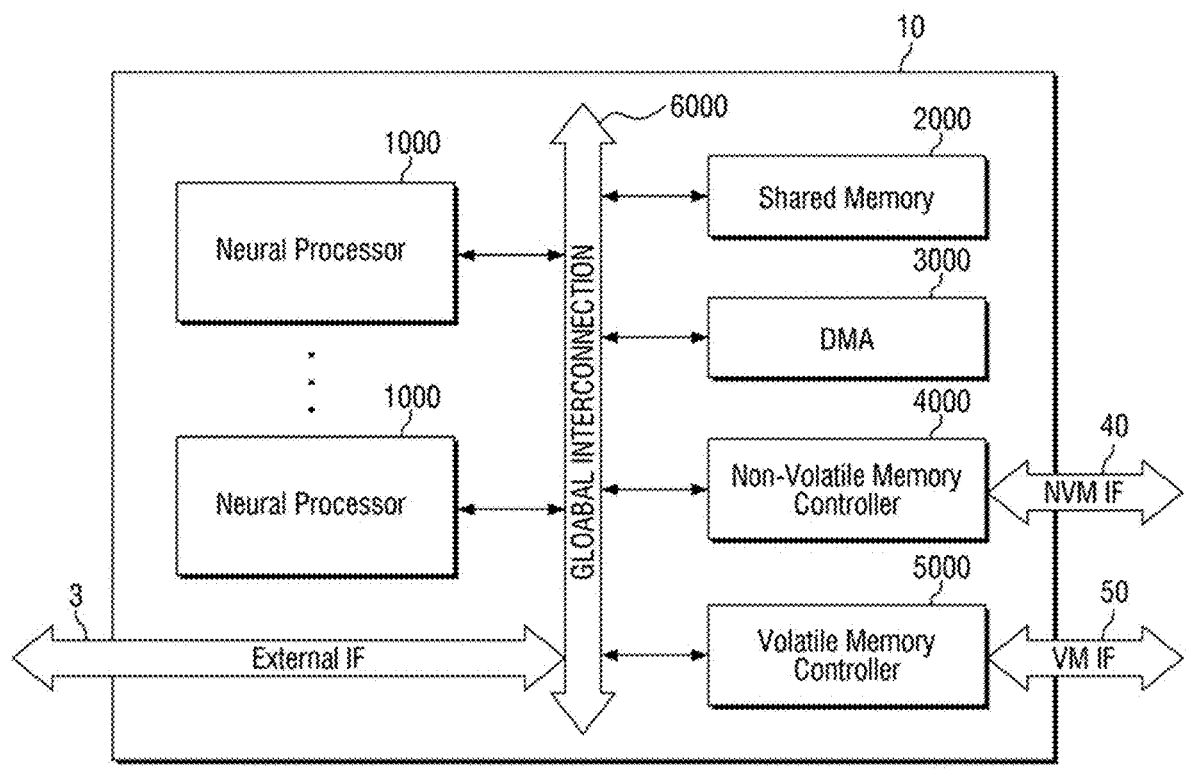
FIG. 3 is a block diagram for illustrating the neural core SoC of FIG. 2.

FIG. 3 is a block diagram for illustrating the neural core SoC of FIG. 2.

Referring to FIGS. 2 and 3, the neural core SoC 10 may include at least one neural processor 1000, a shared memory 2000, direct memory access (DMA) 3000, a non-volatile memory controller 4000, a volatile memory controller 5000, and a global interconnection 6000.

The neural processor 1000 may be a calculation device that directly performs calculation tasks. If there exist neural processors 1000 in plurality, calculation tasks may be assigned to respective neural processors 1000. The respective neural processors 1000 may be connected to each other via the global interconnection 6000.

The shared memory 2000 may be a memory shared by multiple neural processors 1000. The shared memory 2000 may store data of each neural processor 1000. In addition, the shared memory 2000 may receive data from the off-chip memory 30, store the data temporarily, and transfer the data to each neural processor 1000. The shared memory 2000 may also receive data from the neural processor 1000, store the data temporarily, and transfer the data to the off-chip memory 30 of FIG. 2.

The shared memory 2000 may be required to be a relatively high-speed memory. Accordingly, the shared memory 2000 may include, for example, an SRAM. However, the embodiment is not limited thereto. That is, the shared memory 2000 may include a DRAM as well.

The shared memory 2000 may be a memory corresponding to the SoC level, i.e., level 2 (L2). Accordingly, the shared memory 2000 may also be defined as an L2 shared memory.

The DMA 3000 may directly control the movement of data without the need for the neural processor 1000 to control the input/output of data. Accordingly, the DMA 3000 may control the data movement between memories, thereby minimizing the number of interrupts of the neural processor 1000.

The DMA 3000 may control the data movement between the shared memory 2000 and the off-chip memory 30. Via the authority of the DMA 3000, the non-volatile memory controller 4000 and the volatile memory controller 5000 may perform the movement of data.

The non-volatile memory controller 4000 may control the task of reading from or writing onto the non-volatile memory 31. The non-volatile memory controller 4000 may control the non-volatile memory 31 via the first non-volatile memory interface 40. In this case, the non-volatile memory controller 4000 may be referred to as a non-volatile memory controller circuit, but for the sake of convenience, the terms are unified as a non-volatile memory controller. In addition, the non-volatile memory controller 4000 may be implemented as a circuit or circuitry.

The volatile memory controller 5000 may control the task of reading from or writing onto the volatile memory 32. Further, the volatile memory controller 5000 may perform a refresh task of the volatile memory 32. The volatile memory controller 5000 may control the volatile memory 32 via the first volatile memory interface 50. Likewise, the volatile memory controller 5000 may be referred to as a volatile memory controller circuit, but for the sake of convenience, the terms are unified as a volatile memory controller. In addition, the volatile memory controller 5000 may be implemented as a circuit or circuitry.

The global interconnection 6000 may connect the at least one neural processor 1000, the shared memory 2000, the DMA 3000, the non-volatile memory controller 4000, and the volatile memory controller 5000 to one another. In addition, the external interface 3 may also be connected to the global interconnection 6000. The global interconnection 6000 may be a path through which data travels between the at least one neural processor 1000, the shared memory 2000, the DMA 3000, the non-volatile memory controller 4000, the volatile memory controller 5000, and the external interface 3.

The global interconnection 6000 may transmit not only data but also control signals and may transmit a signal for synchronization. That is, in the neural processing device in accordance with some embodiments, each neural processor 1000 may directly transmit and receive a synchronization signal, instead of a separate control processor managing the synchronization signal. Accordingly, it is possible to preclude the latency of the synchronization signal generated by the control processor.

In other words, if there exist neural processors 1000 in plurality, there may be dependencies of individual tasks in which the task of one neural processor 1000 needs to be finished before the next neural processor 1000 can start a new task. The end and start of these individual tasks can be checked and/or coordinated via a synchronization signal, and in conventional techniques, a control processor performed the reception of such a synchronization signal and an instruction to start a new task.

However, as the number of neural processors 1000 increases and task dependencies are designed more complicatedly, the number of requests and instructions for this synchronization task can increase exponentially. Therefore, the latency resulting from each request and instruction can greatly reduce the efficiency of tasks.

Accordingly, in the neural processing device in accordance with some embodiments, each neural processor 1000, instead of the control processor, may directly transmit a synchronization signal to another neural processor 1000 according to the dependency of a task. In this case, several neural processors 1000 can perform the synchronization tasks in parallel as compared with the method managed by the control processor, thereby minimizing the latency due to synchronization.

In addition, the control processor needs to perform the task scheduling of the neural processors 1000 according to a task dependency, and the overhead of such scheduling may increase significantly as the number of neural processors 1000 increases. Accordingly, in the neural processing device, in accordance with some embodiments, the scheduling task is also performed by the individual neural processors 1000, and thus, the performance of the neural processing device can be improved without resulting in an additional scheduling burden.

Figure 4:
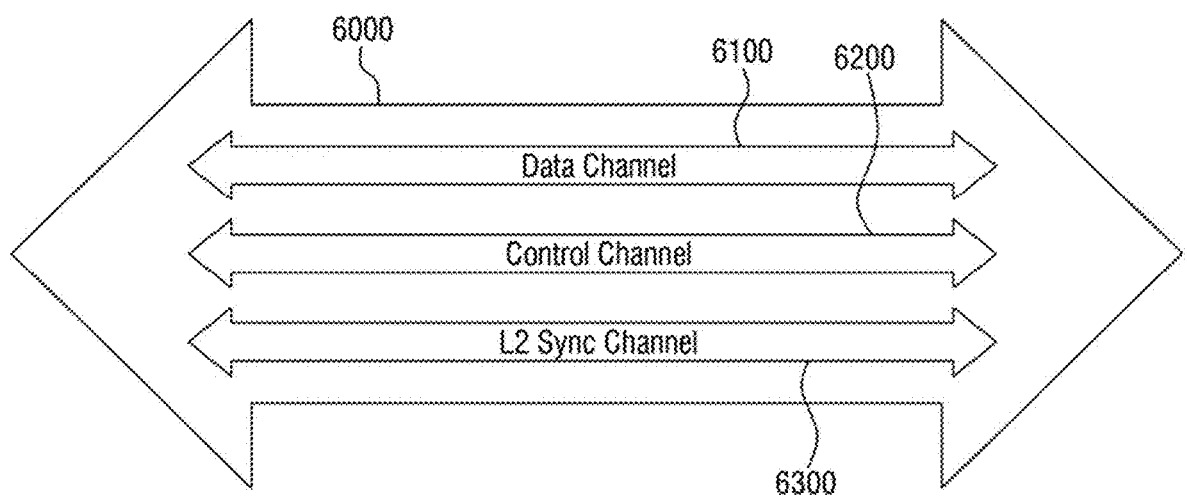
FIG. 4 is a structural diagram for illustrating the global interconnection of FIG. 3.

FIG. 4 is a structural diagram for illustrating the global interconnection of FIG. 3.

Referring to FIG. 4, the global interconnection 6000 may include a data channel 6100, a control channel 6200, and an L2 sync channel 6300.

The data channel 6100 may be a dedicated channel for transmitting data. Through the data channel 6100, the at least one neural processor 1000, the shared memory 2000, the DMA 3000, the non-volatile memory controller 4000, the volatile memory controller 5000, and the external interface 3 may exchange data with one another.

The control channel 6200 may be a dedicated channel for transmitting control signals. Through the control channel 6200, the at least one neural processor 1000, the shared memory 2000, the DMA 3000, the non-volatile memory controller 4000, the volatile memory controller 5000, and the external interface 3 may exchange control signals with one another.

The L2 sync channel 6300 may be a dedicated channel for transmitting synchronization signals. Through the L2 sync channel 6300, the at least one neural processor 1000, the shared memory 2000, the DMA 3000, the non-volatile memory controller 4000, the volatile memory controller 5000, and the external interface 3 may exchange synchronization signals with one another.

The L2 sync channel 6300 may be set as a dedicated channel inside the global interconnection 6000, and thus, may not overlap with other channels and transmit synchronization signals quickly. Accordingly, the neural processing device in accordance with some embodiments does not require new wiring work and may smoothly perform the synchronization task by using the global interconnection 6000.

Figure 5:
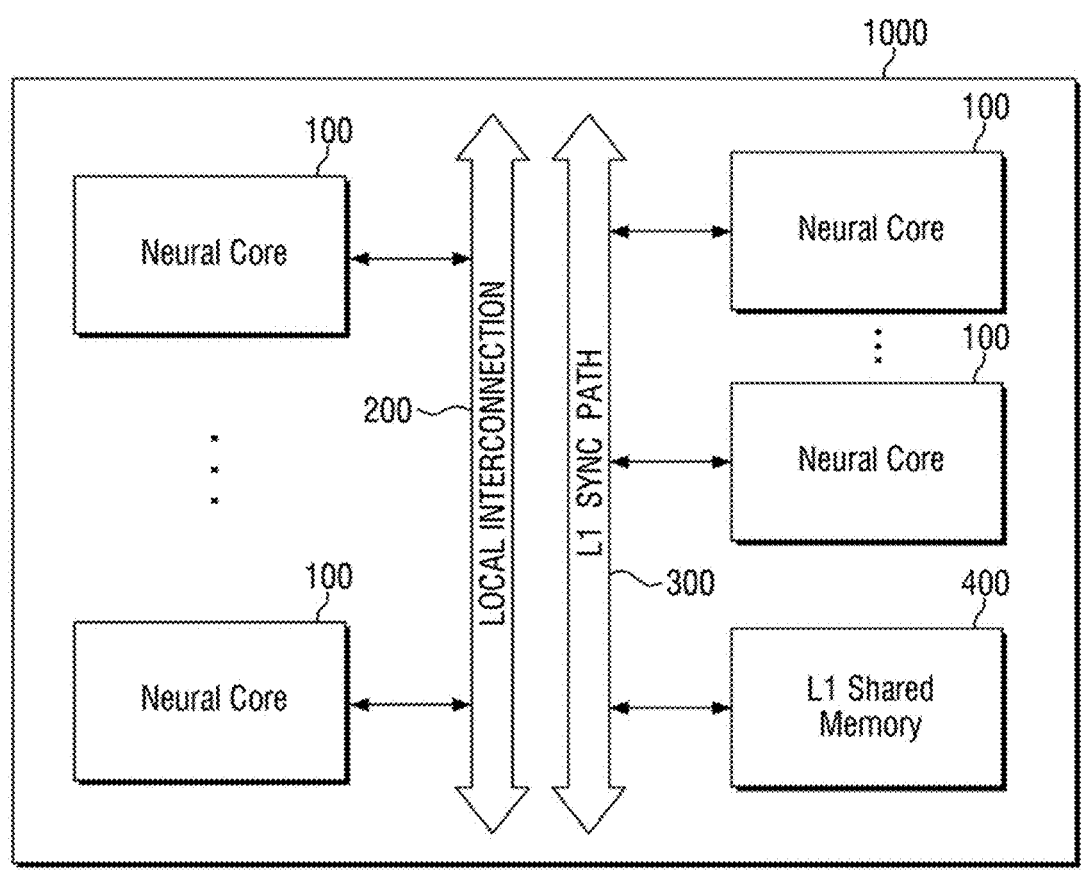
FIG. 5 is a block diagram for illustrating the neural processor of FIG. 3.

FIG. 5 is a block diagram for illustrating the neural processor of FIG. 3.

Referring to FIGS. 3 to 5, the neural processor 1000 may include at least one neural core 100, an L1 shared memory 400, a local interconnection 200, and an L1 sync path 300.

The at least one neural core 100 may share and perform the tasks of the neural processor 1000. The number of neural cores 100 may be, for example, eight. However, the embodiment is not limited thereto. FIGS. 3 and 5 illustrate that a plurality of neural cores are included in the neural processor 1000, but the embodiment is not limited thereto. That is, the neural processor 1000 may be configured with only one neural core.

The L1 shared memory 400 may be a memory shared by the neural cores 100 in the neural processor 1000. The L1 shared memory 400 may store data of each neural core 100. In addition, the L1 shared memory 400 may receive data from the shared memory 2000 of FIG. 3, store them temporarily, and transfer them to each neural core 100. On the contrary, the L1 shared memory 400 may also receive data from the neural core 100, store them temporarily, and transfer them to the shared memory 2000 of FIG. 3.

The L1 shared memory 400 may be a memory corresponding to the neural processor level, i.e., level 1 (L1). The L2 shared memory, i.e., the shared memory 2000 may be shared by the neural processors 1000, and the L1 shared memory 400 may be shared by the neural cores 100.

The local interconnection 200 may connect the at least one neural core 100 and the L1 shared memory 400 to each other. The local interconnection 200 may be a path through which data travels between the at least one neural core 100 and the L1 shared memory 400. The local interconnection 200 may be connected and transmit data to the global interconnection 6000 of FIG. 3.

The L1 sync path 300 may connect the at least one neural core 100 and the L1 shared memory 400 to each other. The L1 sync path 300 may be a path through which synchronization signals of the at least one neural core 100 and the L1 shared memory 400 travel.

The L1 sync path 300 may be formed physically separately from the local interconnection 200. In the case of the local interconnection 200, sufficient channels may not be formed therein, unlike the global interconnection 6000. In such a case, the L1 sync path 300 may be formed separately so that the synchronization signal can be transmitted quickly and without any delay. The L1 sync path 300 may be used for synchronization performed at a level one step lower than that of the L2 sync channel 6300 of the global interconnection 6000.

Figure 6:
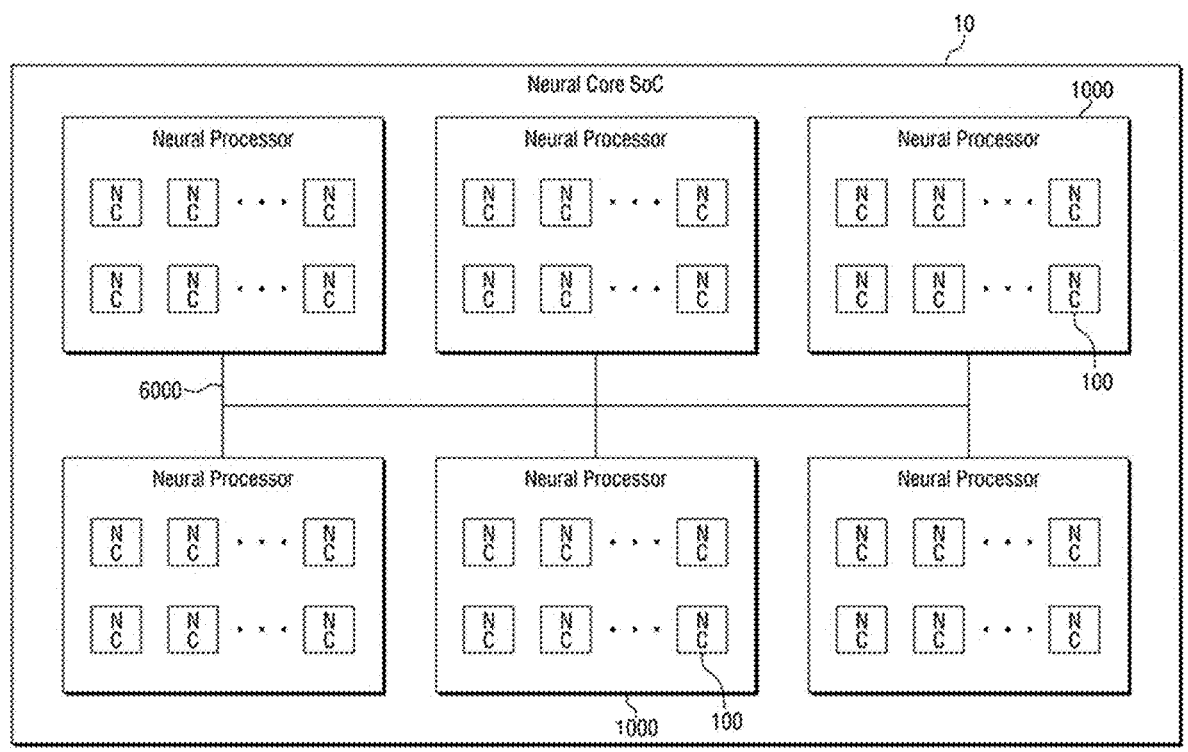
FIG. 6 is a diagram for illustrating a hierarchical structure of a neural processing device in accordance with some embodiments of the disclosure.

FIG. 6 is a diagram for illustrating a hierarchical structure of a neural processing device in accordance with some embodiments of the disclosure.

Referring to FIG. 6, the neural core SoC 10 may include at least one neural processor 1000. Each neural processor 1000 may transmit data to each other via the global interconnection 6000.

The neural processors 1000 may each include at least one neural core 100. The neural core 100 may be a processing unit optimized for deep learning calculation tasks. The neural core 100 may be a processing unit corresponding to one operation of a deep learning calculation task. In other words, a deep learning calculation task can be represented by a sequential or parallel combination of multiple operations. The neural cores 100 may each be a processing unit capable of processing one operation, and may be a minimum calculation unit that can be considered for scheduling from the viewpoint of a compiler.

The neural processing device in accordance with the embodiment may configure the scales of the minimum calculation unit considered from the viewpoint of compiler scheduling and the hardware processing unit to be the same, so that fast and efficient scheduling and calculation tasks can be performed.

That is, if the processing units into which hardware can be divided are too large compared to calculation tasks, inefficiency of the calculation tasks may occur in driving the processing units. Conversely, it is not appropriate to schedule a processing unit that is a unit smaller than an operation, which is the minimum scheduling unit of the compiler, every time since a scheduling inefficiency may occur and hardware design costs may increase.

Therefore, by adjusting the scales of the scheduling unit of the compiler and the hardware processing unit to be similar in the embodiment, it is possible to simultaneously satisfy the fast scheduling of calculation tasks and the efficient execution of the calculation tasks without wasting hardware resources.

Figure 7:
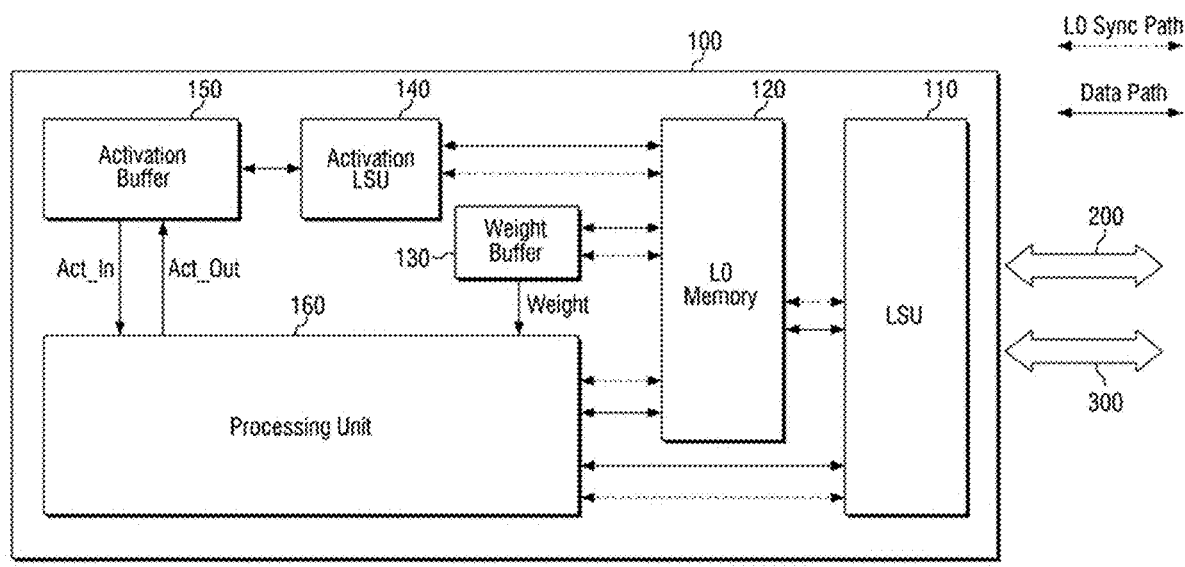
FIG. 7 is a block diagram for illustrating the neural core of FIG. 5 in detail.

FIG. 7 is a block diagram for illustrating the neural core of FIG. 5 in detail.

Referring to FIG. 7, the neural core 100 may include a load/store unit (LSU) 110, an L0 memory 120, a weight buffer 130, an activation LSU 140, an activation buffer 150, and a processing unit 160.

The LSU 110 may receive at least one of data, a control signal, or a synchronization signal from the outside via the local interconnection 200 and the L1 sync path 300. The LSU 110 may transmit at least one of the data, the control signal, or the synchronization signal received to the L0 memory 120. Similarly, the LSU 110 may transfer at least one of the data, the control signal, or the synchronization signal to the outside via the local interconnection 200 and the L1 sync path 300. In this case, the LSU 110 may be referred to as an LSU circuit, but for the sake of convenience, the terms are unified as an LSU. In addition, the LSU 110 may be implemented as a circuit or circuitry.

Figure 8:
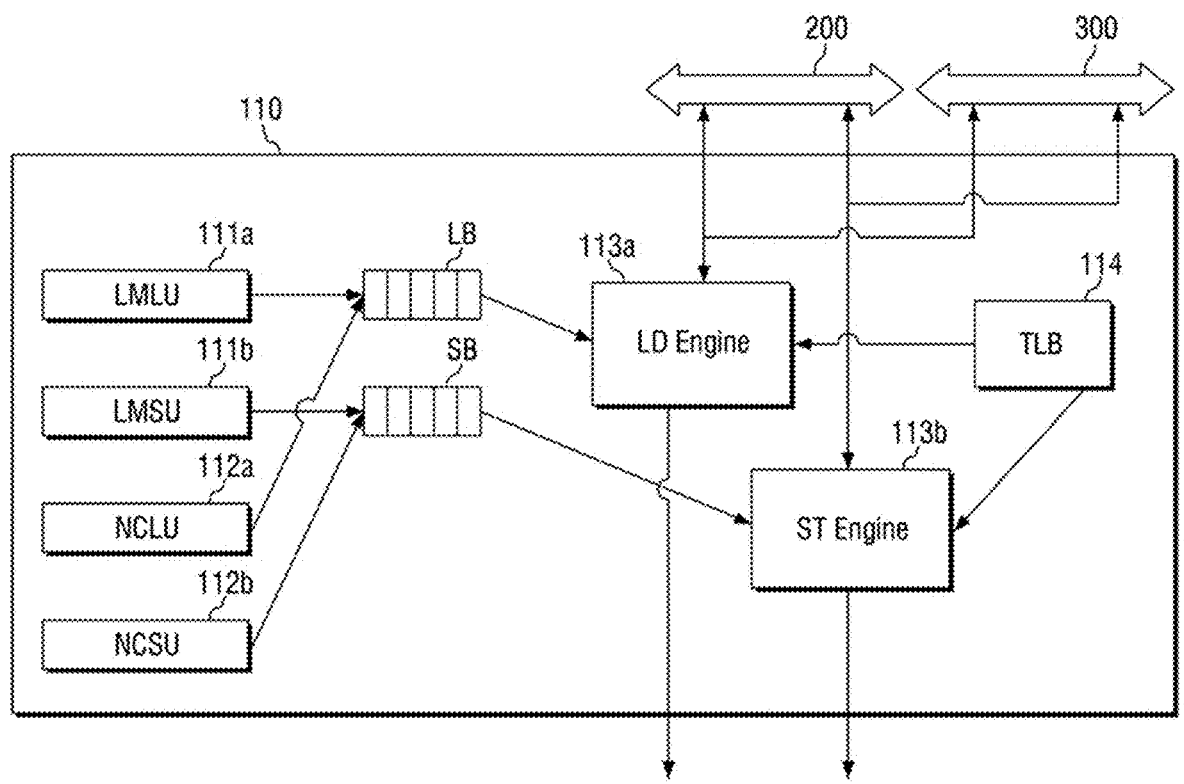
FIG. 8 is a block diagram for illustrating the LSU of FIG. 7 in detail.

FIG. 8 is a block diagram for illustrating the LSU of FIG. 7 in detail.

Referring to FIG. 8, the LSU 110 may include a local memory load unit (LMLU) 111a, a local memory store unit (LMSU) 111b, a neural core load unit (NCLU) 112a, a neural core store unit (NCSU) 112b, a load buffer LB, a store buffer SB, a load (LD) engine 113a, a store (ST) engine 113b, and a translation lookaside buffer (TLB) 114.

The local memory load unit 111a, the local memory store unit 111b, the neural core load unit 112a, the neural core store unit 112b, the load engine 113a, and the store engine 113b may be referred to respectively as a local memory load circuit, a local memory store circuit, a neural core load circuit, a neural core store circuit, a load engine circuit, and a store engine circuit. However, for the sake of convenience, the terms are respectively unified as a local memory load unit, a local memory store unit, a neural core load unit, a neural core store unit, a load engine, and a store engine. In addition, the local memory load unit 111a, the local memory store unit 111b, the neural core load unit 112a, the neural core store unit 112b, the load engine 113a, and the store engine 113b may each be implemented as a circuit or circuitry.

The local memory load unit 111a may fetch a load instruction for the L0 memory 120 and issue the load instruction. When the local memory load unit 111a provides the issued load instruction to the load buffer LB, the load buffer LB may sequentially transmit memory access requests to the load engine 113a according to the inputted order.

Further, the local memory store unit 111b may fetch a store instruction for the L0 memory 120 and issue the store instruction. When the local memory store unit 111b provides the issued store instruction to the store buffer SB, the store buffer SB may sequentially transmit memory access requests to the store engine 113b according to the inputted order.

The neural core load unit 112a may fetch a load instruction for the neural core 100 and issue the load instruction. When the neural core load unit 112a provides the issued load instruction to the load buffer LB, the load buffer LB may sequentially transmit memory access requests to the load engine 113a according to the inputted order.

In addition, the neural core store unit 112b may fetch a store instruction for the neural core 100 and issue the store instruction. When the neural core store unit 112b provides the issued store instruction to the store buffer SB, the store buffer SB may sequentially transmit memory access requests to the store engine 113b according to the inputted order.

The load engine 113a may receive the memory access request and retrieve data via the local interconnection 200. At this time, the load engine 113a may quickly find the data by using a translation table of a logical address and a physical address that has been used recently in the translation lookaside buffer 114. If the logical address of the load engine 113a is not in the translation lookaside buffer 114, the address translation information may be found in another memory.

The store engine 113b may receive the memory access request and retrieve data via the local interconnection 200. At this time, the store engine 113b may quickly find the data by using a translation table of a logical address and a physical address that has been used recently in the translation lookaside buffer 114. If the logical address of the store engine 113b is not in the translation lookaside buffer 114, the address translation information may be found in another memory.

The load engine 113a and the store engine 113b may send synchronization signals to the L1 sync path 300. At this time, the synchronization signal may indicate that the task has been completed.

Referring to FIG. 7 again, the L0 memory 120 is a memory located inside the neural core 100, and may receive all input data required for the tasks by the neural core 100 from the outside and store them temporarily. In addition, the L0 memory 120 may temporarily store the output data calculated by the neural core 100 for transmission to the outside. The L0 memory 120 may serve as a cache memory of the neural core 100.

The L0 memory 120 may transmit an input activation Act_In to the activation buffer 150 and receive an output activation Act_Out via the activation LSU 140. The L0 memory 120 may directly transmit and receive data to and from the processing unit 160, in addition to the activation LSU 140. In other words, the L0 memory 120 may exchange data with each of a processing element (PE) array 163 and a vector unit 164. The L0 memory 120 may be a memory corresponding to the level of the neural core. In this case, the L0 memory 120 may be a private memory of the neural core that is not shared.

The L0 memory 120 may be a memory corresponding to the level of the neural core. In this case, the L0 memory 120 may be a private memory of the neural core.

The L0 memory 120 may transmit data such as activations or weights via a data path. The L0 memory 120 may exchange synchronization signals via an L0 sync path, which is a separate dedicated path. The L0 memory 120 may exchange synchronization signals with, for example, the LSU 110, the weight buffer 130, the activation LSU 140, and the processing unit 160 via the L0 sync path.

The weight buffer 130 may receive a weight from the L0 memory 120. The weight buffer 130 may transfer the weight to the processing unit 160. The weight buffer 130 may temporarily store the weight before transferring it.

The input activation Act_In and the output activation Act_Out may refer to input values and output values of the layers of a neural network. In this case, if there are a plurality of layers in the neural network, the output value of the previous layer becomes the input value of the next layer, and thus, the output activation Act_Out of the previous layer may be utilized as the input activation Act_In of the next layer.

The weight may refer to a parameter that is multiplied by the input activation Act_In inputted in each layer. The weight is adjusted and confirmed in the deep learning training phase, and may be used to derive the output activation Act_Out via a fixed value in the inference phase.

The activation LSU 140 may transfer the input activation Act_In from the L0 memory 120 to the activation buffer 150, and the output activation Act_Out from the activation buffer 150 to the on-chip buffer. In other words, the activation LSU 140 may perform both a load task and a store task of the activation.

The activation buffer 150 may provide the input activation Act_In to the processing unit 160 and receive the output activation Act_Out from the processing unit 160. The activation buffer 150 may temporarily store the input activation Act_In and the output activation Act_Out.

The activation buffer 150 may quickly provide the activation to the processing unit 160, in particular, the PE array 163, which has a large quantity of calculations, and may quickly receive the activation, thereby increasing the calculation speed of the neural core 100.

The processing unit 160 may be a module that performs calculations. The processing unit 160 may perform not only one-dimensional calculations but also two-dimensional matrix calculations, i.e., convolution operations. The processing unit 160 may receive an input activation Act_In, multiply it by a weight, and then add it to generate an output activation Act_Out.

Figure 9:
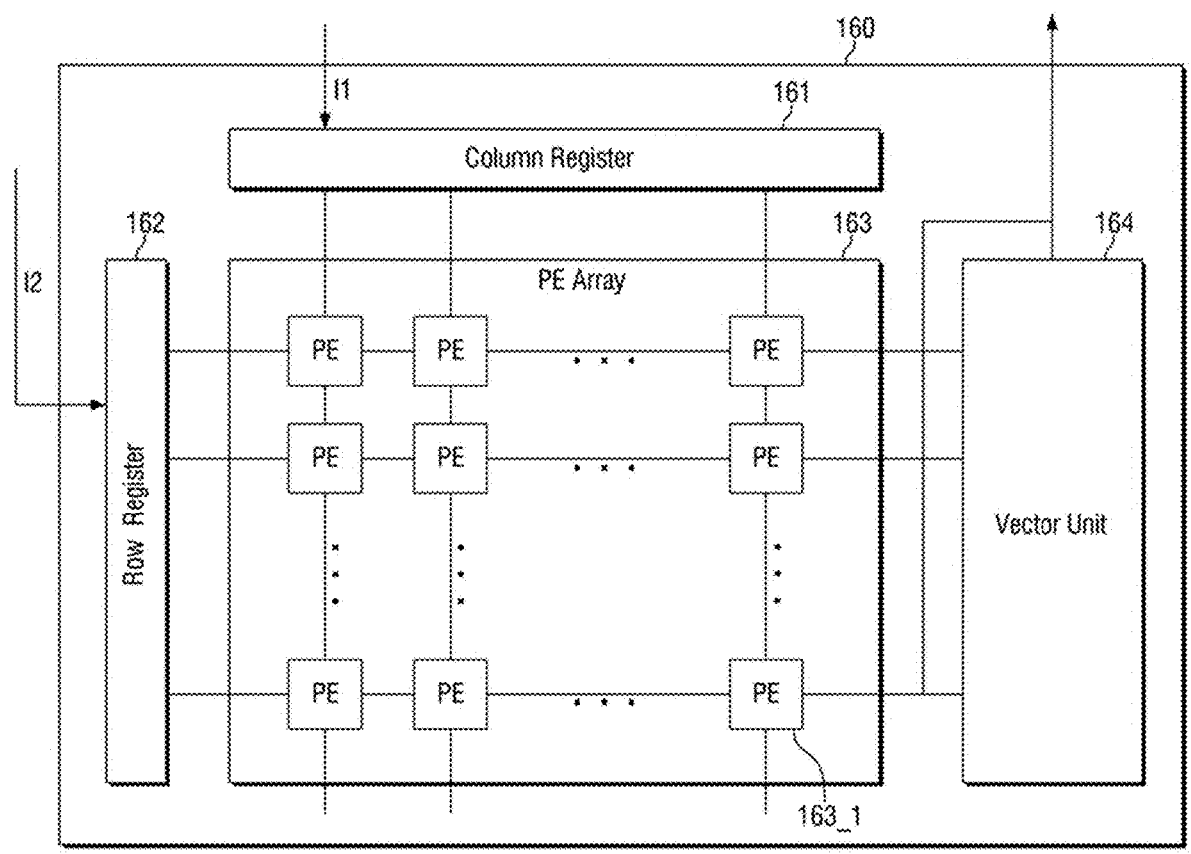
FIG. 9 is a block diagram for illustrating the processing unit of FIG. 7.

FIG. 9 is a block diagram for illustrating the processing unit of FIG. 7 in detail.

Referring to FIG. 7 and FIG. 9, the processing unit 160 may include a PE array 163, a vector unit 164, a column register 161, and a row register 162.

The PE array 163 may receive the input activation Act_In and the weight and perform multiplication on them. In this case, each of the input activation Act_In and the weight may be in the form of matrices and calculated via convolution. Through this, the PE array 163 may generate an output activation Act_Out. However, the embodiment is not limited thereto. The PE array 163 may generate any types of outputs other than the output activation Act_Out as well.

The PE array 163 may include at least one processing element (PE) 163_1. The processing elements 163_1 may be aligned with each other so that each of the processing elements 163_1 may perform multiplication on one input activation Act_In and one weight.

The PE array 163 may sum values for each multiplication to generate a subtotal. This subtotal may be utilized as an output activation Act_Out. The PE array 163 performs two-dimensional matrix multiplication, and thus, may be referred to as a 2D matrix compute unit.

The vector unit 164 may mainly perform one-dimensional calculations. The vector unit 164, together with the PE array 163, may perform deep learning calculations. Through this, the processing unit 160 may be specialized for necessary calculations. In other words, each of the at least one neural core 100 has calculation modules that perform a large amount of two-dimensional matrix multiplications and one-dimensional calculations, and thus, can efficiently perform deep learning tasks.

The column register 161 may receive a first input I1. The column register 161 may receive the first input I1, and distribute them to each column of the processing elements 163_1.

The row register 162 may receive a second input I2. The row register 162 may receive the second input I2, and distribute them to each row of the processing elements 163_1.

The first input I1 may be an input activation Act_In or a weight. The second input I2 may be a value other than the first input I1 between the input activation Act_In or the weight. Alternatively, the first input I1 and the second input I2 may be values other than the input activation Act_In and the weight.

Figure 10:
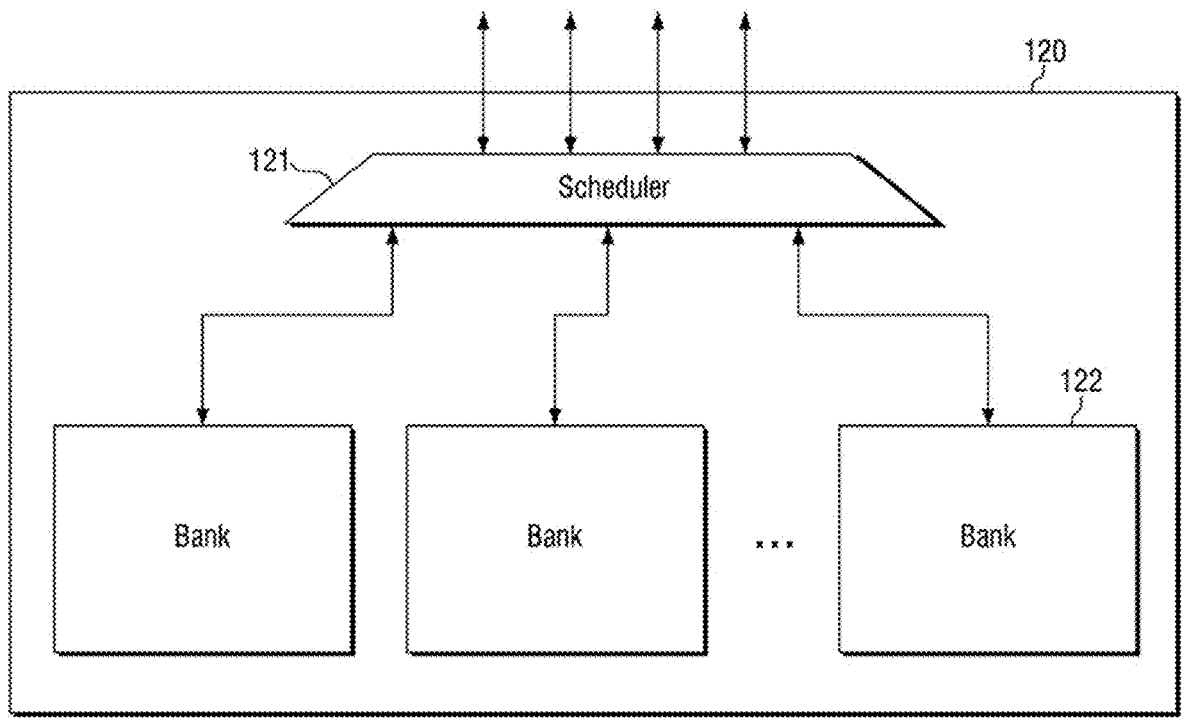
FIG. 10 is a block diagram for illustrating the L0 memory of FIG. 7 in detail.

FIG. 10 is a block diagram for illustrating the L0 memory of FIG. 7 in detail.

Referring to FIG. 10, the L0 memory 120 may include a scheduler 121 and one or more local memory banks 122.

When data is stored in the L0 memory 120, the scheduler 121 may receive data from the load engine 113a. In this case, the local memory bank 122 may be allocated for the data in a round-robin manner. Accordingly, data may be stored in any one of the local memory banks 122.

In contrast to this, when data is loaded from the L0 memory 120, the scheduler 121 may receive the data from the local memory bank 122 and transmit the data to the store engine 113b. The store engine 113b may store the data in the outside through the local interconnection 200. In this case, the scheduler 121 may be referred to as a scheduler circuit, but for the sake of convenience, the term is unified as a scheduler. In addition, the scheduler 121 may be implemented as a circuit or circuitry.

Figure 11:
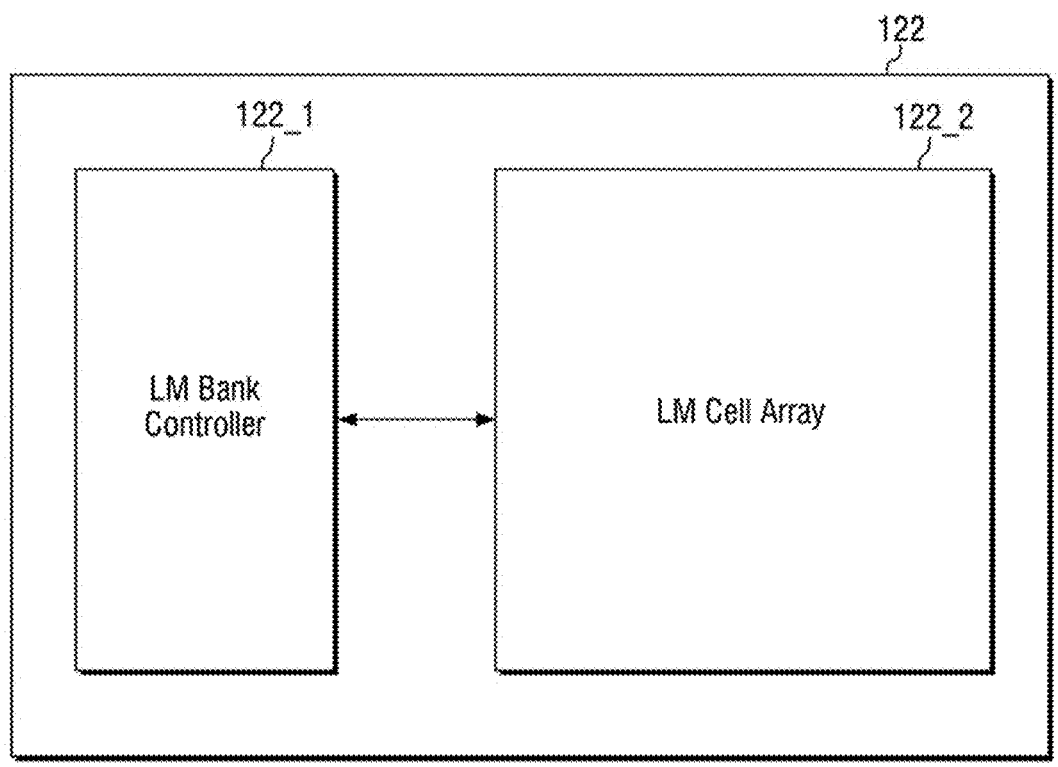
FIG. 11 is a block diagram for illustrating the local memory bank of FIG. 10.

FIG. 11 is a block diagram for illustrating the local memory bank of FIG. 10 in detail.

Referring to FIG. 11, the local memory bank 122 may include a local memory bank controller 122_1 and a local memory bank cell array 122_2.

The local memory bank controller 122_1 may manage read and write operations via the addresses of data stored in the local memory bank 122. In other words, the local memory bank controller 122_1 may manage the input/output of data as a whole.

The local memory bank cell array 122_2 may be of a structure in which cells in which data is directly stored are arranged in rows and columns. The local memory bank cell array 122_2 may be controlled by the local memory bank controller 122_1.

Figure 12A:
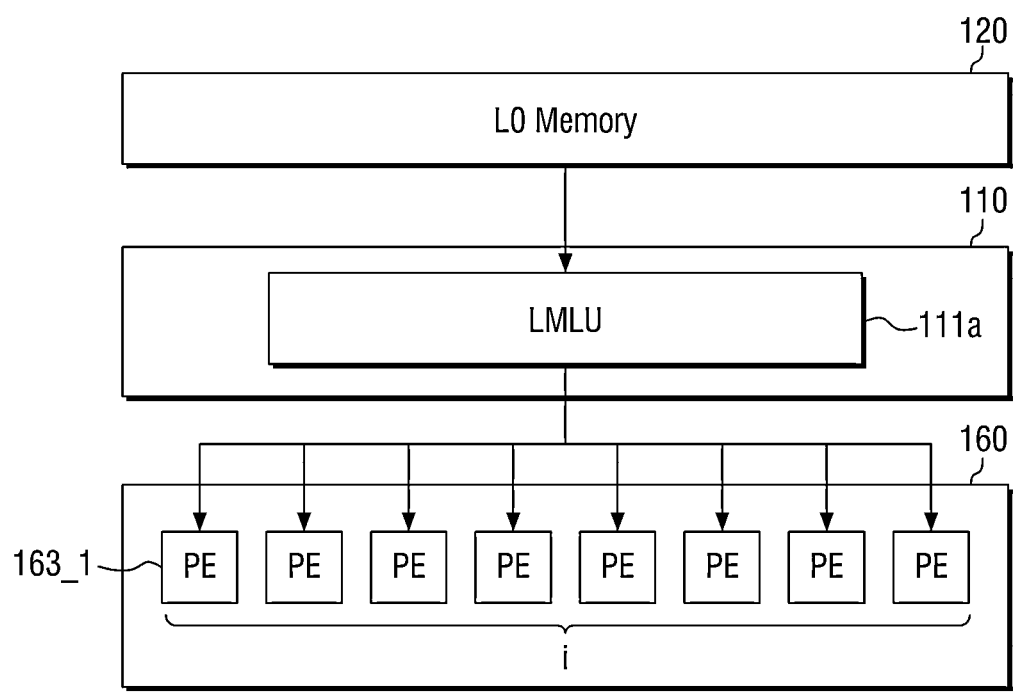
FIG. 12A is a block diagram for illustrating an operation of the local memory load unit of the LSU of FIG. 8.

FIG. 12A is a block diagram for illustrating an operation of the local memory load unit of the LSU of FIG. 8.

Referring to FIG. 12A, the local memory load unit 111a may load the input data from the L0 memory 120 according to an instruction. At this time, the instruction may designate a destination, i.e., a place into which the input data is loaded. Accordingly, the local memory load unit 111a may transmit the input data to the processing unit 160. At this time, the local memory load unit 111a in accordance with the embodiment may transmit the input data as it is, but may transform the input data and transmit transformed data.

The processing unit 160 may have a plurality of processing elements 163_1. Accordingly, the processing unit 160 may simultaneously receive a plurality of input data (or a plurality of transformed data). At this time, a number of pieces of data received simultaneously may be i. In this case, i may be an integer greater than or equal to 1.

Figure 12B:
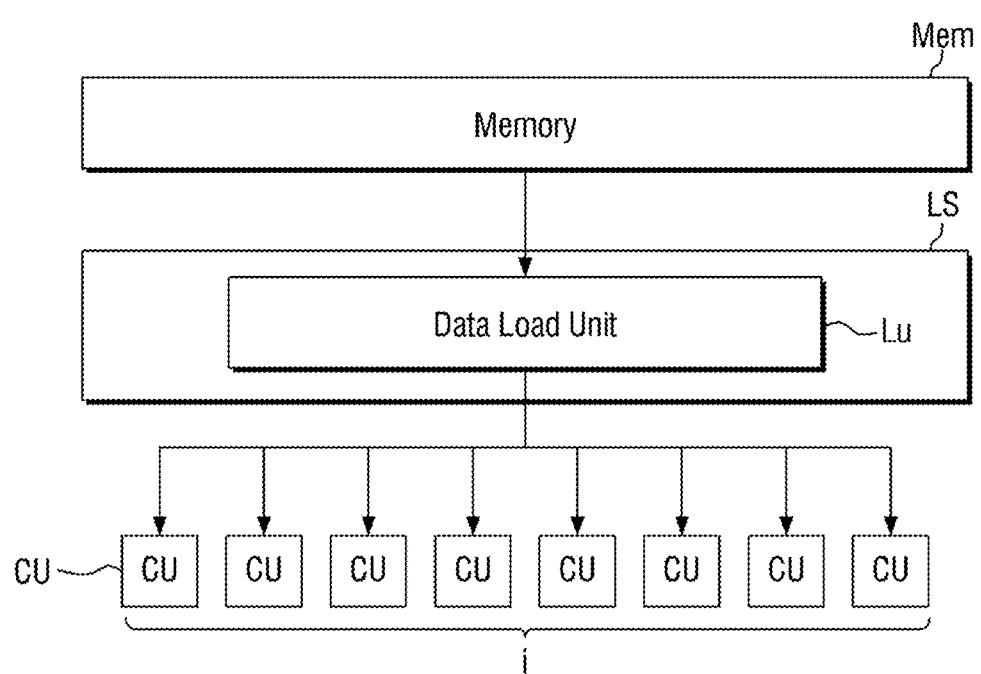
FIG. 12B is a block diagram for illustrating an operation of a data load unit in accordance with some embodiments of the disclosure.

FIG. 12B is a block diagram for illustrating an operation of a data load unit in accordance with some embodiments of the disclosure. A memory Mem, a load store module LS, a data load unit Lu, and at least one compute unit CU of FIG. 12B may correspond to the L0 memory 120, the LSU 110, the local memory load unit 111a, and the processing element 163_1 of FIG. 12B, respectively. Alternatively, the memory Mem, the load store module LS, the data load unit Lu, and the compute unit CU may be generalized devices of the L0 memory 120, the LSU 110, the local memory load unit 111a, and the processing element 163_1 of FIG. 12A, respectively.

Referring to FIG. 12B, the data load unit Lu in the load store module LS may load input data from the memory Mem according to an instruction. At this time, the instruction may designate a destination, i.e., a place into which the input data is loaded. Accordingly, the data load unit Lu may transmit the input data to the at least one compute unit CU. At this time, the data load unit Lu in accordance with the embodiment may transmit the input data as it is, but may transform the input data and transmit transformed data.

The at least one compute unit CU may be in plurality. Accordingly, the compute units CU may simultaneously receive a plurality of input data (or a plurality of transformed data). At this time, a number of pieces of data received simultaneously may be i.

The data load unit Lu may perform data load operations between various memories Mem and compute units CU in the neural processing device of the disclosure. That is, the memory Mem may correspond to any memory responsible for storing data of the neural processing device of the disclosure, and the compute unit CU may correspond to any compute unit that performs operations of the neural processing device of the disclosure.

In this case, the load store module LS, the data load unit Lu, and the compute unit CU may be referred to respectively as a load store circuit, a data load circuit and a compute circuit. However, for the sake of convenience, the terms are respectively unified as a load store module, a data load unit and a compute unit. Further, the load store module LS, the data load unit Lu and the compute unit CU may each be implemented as a circuit or circuitry.

Figure 13A:
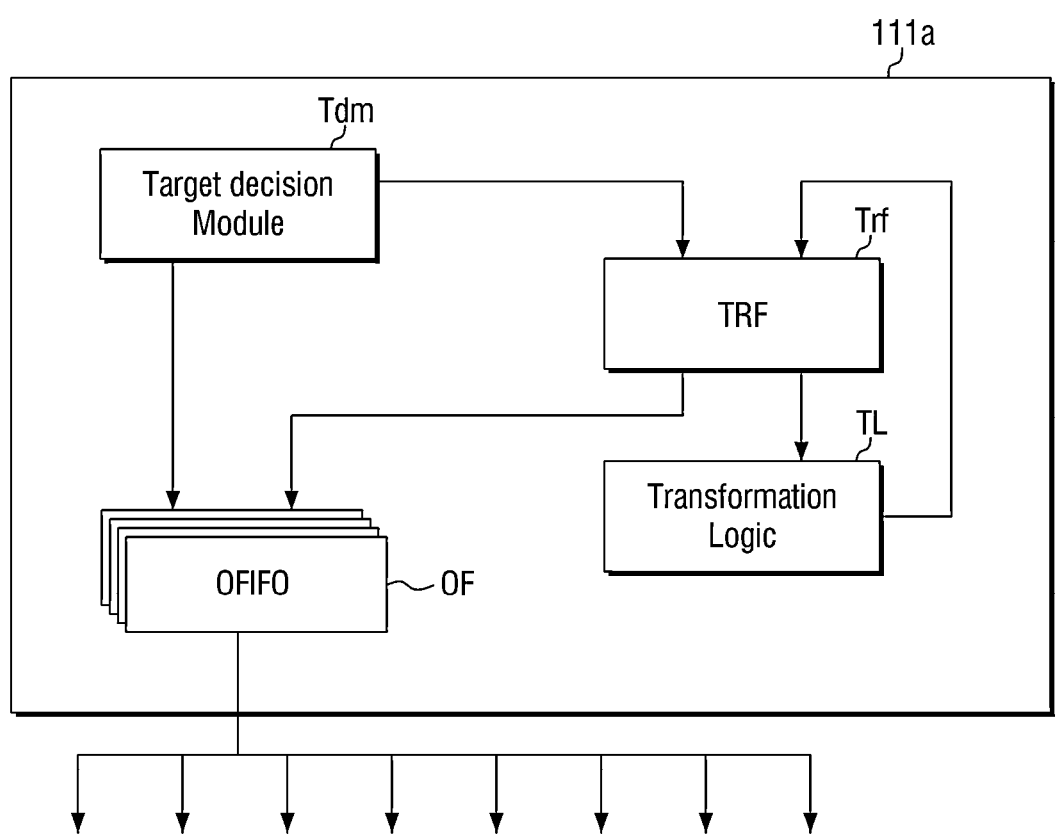
FIG. 13A is a block diagram for illustrating the structure of the local memory load unit of FIG. 12A.

FIG. 13A is a block diagram for illustrating the structure of the local memory load unit of FIG. 12A.

Referring to FIG. 13A, the local memory load unit 111a may include a target decision module Tdm, a tensor register file Trf, a transformation logic TL, and an output first in first out (FIFO) OF.

The target decision module Tdm, the tensor register file Trf, the transformation logic TL, and the output FIFO OF may be referred to respectively as a target decision circuit, a tensor register file circuit, a transformation logic circuit, and an output FIFO circuit. However, for the sake of convenience, the terms are respectively unified as a target decision module, a tensor register file, a transformation logic, and an output FIFO. In addition, the target decision module Tdm, the tensor register file Trf, the transformation logic TL, and the output FIFO OF may each be implemented as a circuit or circuitry.

The target decision module Tdm may receive an instruction. At this time, the instruction may be a simple load instruction or a layout transform instruction. The simple load instruction can instruct the identification of input data and the designation of a destination. In contrast, the layout transform instruction may instruct a merge operation or a shuffle operation. In this case, the layout transform instruction may be an instruction for transforming the layout of data. A layout transformation may be, for example, any one of transpose, permute, or unpack, but is not limited thereto.

The target decision module Tdm may decode the instruction and identify which data of the L0 memory 120 to fetch as the input data. Further, the target decision module Tdm may determine which operation to perform. For example, the target decision module Tdm may recognize any one of a simple load operation, a merge operation, or a shuffle operation. However, the embodiment is not limited thereto.

If the target decision module Tdm receives a simple load instruction, the target decision module Tdm may transmit the input data as it is to the output FIFO OF and perform the load operation only. On the other hand, if the target decision module Tdm receives a layout transform instruction of a merge operation or a shuffle operation, the target decision module Tdm may cause the transformation logic TL to perform a merge operation or a shuffle operation, respectively.

In addition, the target decision module Tdm may find out a destination, i.e., the destination of the input data from the instruction, and cause the input data or the transformed data to be transmitted to the corresponding destination by the output FIFO OF.

The tensor register file Trf may receive the input data from the target decision module Tdm by the layout transform instruction. The tensor register file Trf may receive and temporarily store the input data. The tensor register file Trf may transmit the input data to the transformation logic TL.

The tensor register file Trf may receive the transformed data from the transformation logic TL. The tensor register file Trf may temporarily store the received transformed data. The tensor register file Trf may transmit the transformed data to the output FIFO OF.

When storing the input data and the transformed data, the input data of the transformed data may be tiled in data granules of same size and may be stored in the tensor register file Trf. A number of address entries of each tiled area may be the same as a number of output FIFO OF.

The output FIFO OF may receive and store the input data from the target decision module Tdm when a simple load instruction is received at the target decision module Tdm. In addition, when a layout transform instruction is received at the target decision module Tdm, the target decision module Tdm may send the input data to the tensor register file Trf, the transformation logic TL may transform the input data into transformed data, and then the output FIFO OF may receive and store the transformed data again via the tensor register file Trf.

The output FIFO OF may send the transformed data to the processing unit 160. At this time, the output FIFO OF may tile the transformed data into data granules of a certain size and transmit the tiled transformed data to the processing unit 160 at the same time. In this case, the output FIFO OF may include a plurality of FIFOs, and a number of FIFOs may be equal to a number of entries in the tensor register file Trf. In each FIFO of the output FIFO OF, the transformed data may be tiled in granules of a certain size and stored, and may each be transmitted to the processing unit 160 at the same time.

Figure 13B:
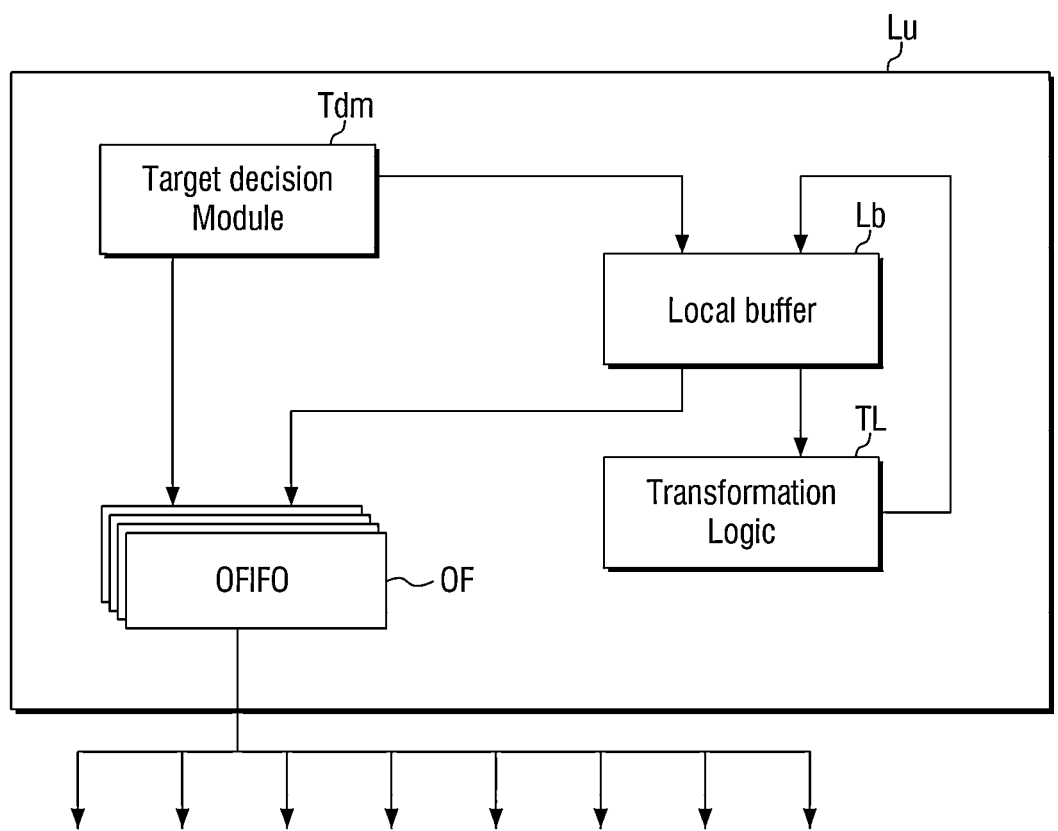
FIG. 13B is a block diagram for illustrating the structure of the data load unit of FIG. 13A.

FIG. 13B is a block diagram for illustrating the structure of the data load unit of FIG. 13A.

Referring to FIG. 13B, the data load unit Lu may include a target decision module Tdm, a local buffer Lb, a transformation logic TL, and an output FIFO OF.

The target decision module Tdm, the transformation logic TL, and the output FIFO OF are the same as the description of FIG. 13A, and the local buffer Lb may perform the same operation as the tensor register file Trf of FIG. 13A.

However, the local buffer Lb may correspond to any buffer that performs buffering of the neural processing device of the disclosure.

Figure 14:
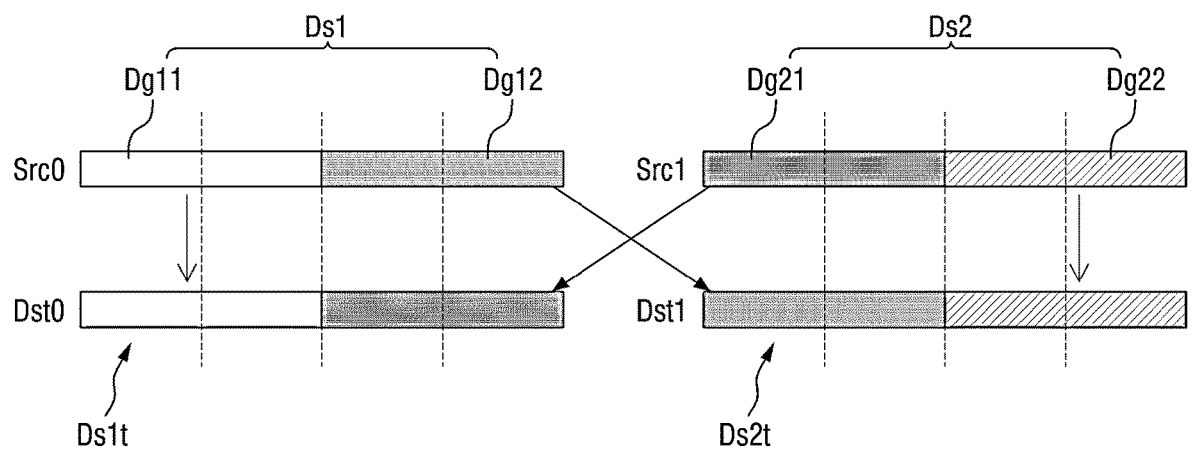
FIG. 14 is a conceptual diagram for illustrating a merge operation of the transformation logic of FIG. 13A or 13B.

FIG. 14 is a conceptual diagram for illustrating a merge operation of the transformation logic of FIG. 13A or 13B.

Referring to FIGS. 13A, 13B, and 14, when the transformation logic TL performs a merge operation, the input data may include first input data Ds1 and second input data Ds2. That is, the transformation logic TL may perform the merge operation via two pieces of input data. In this case, the transformed data, which is a result of the merge operation, may also include first transformed data Ds1*t* and second transformed data Ds2*t*. That is, the transformation logic TL may have two inputs and two outputs.

The first input data Ds1 may be inputted to a first source Src0, and the second input data Ds2 may be inputted to a second source Src1. The first transformed data Ds1*t* may be outputted to a first destination Dst0, and the second transformed data Ds2*t* may be outputted to a second destination Dst1.

The first input data Ds1 may include a (1_1)th granule Dg11 and a (1_2)th granule Dg12. The second input data Ds2 may include a (2_1)th granule Dg21 and a (2_2)th granule Dg22. Each data granule may all be of same size. Accordingly, the first input data Ds1 and the second input data Ds2 may also have the same size.

The transformation logic TL may exchange the positions of the (1_2)th granule Dg12 and the (2_1)th granule Dg21 with each other and generate the first transformed data Ds1*t* and the second transformed data Ds2*t*. Accordingly, the first transformed data Ds1*t* may include the (1_1)th granule Dg11 and the (2_1)th granule Dg21. The second transformed data Ds2*t* may include the (1_2)th granule Dg12 and the (2_2)th granule Dg22.

The first transformed data Ds1*t* may have a same size as the second transformed data Ds2*t*. Further, the first transformed data Ds1*t* and the first input data Ds1 may also have the same size, and the second transformed data Ds2*t* and the second input data Ds2 may have the same size as well.

As indicated by dotted lines in FIG. 14, the first transformed data Ds1*t* and the second transformed data Ds2*t* may be divided by tiling. Accordingly, each tiled area may be simultaneously transmitted to the processing unit 160 by the output FIFO OF. A number of these tiled areas may be equal to a number of FIFOs in the output FIFO OF. If the first input data Ds1 and the second input data Ds2 are 128 bytes, a size of each granule may be 64 bytes. In other words, the dotted lines in FIG. 14 may be marks that divide each data into 32-byte units. This may be indicated similarly in other drawings below as well. However, the embodiment is not limited thereto.

Figure 15:
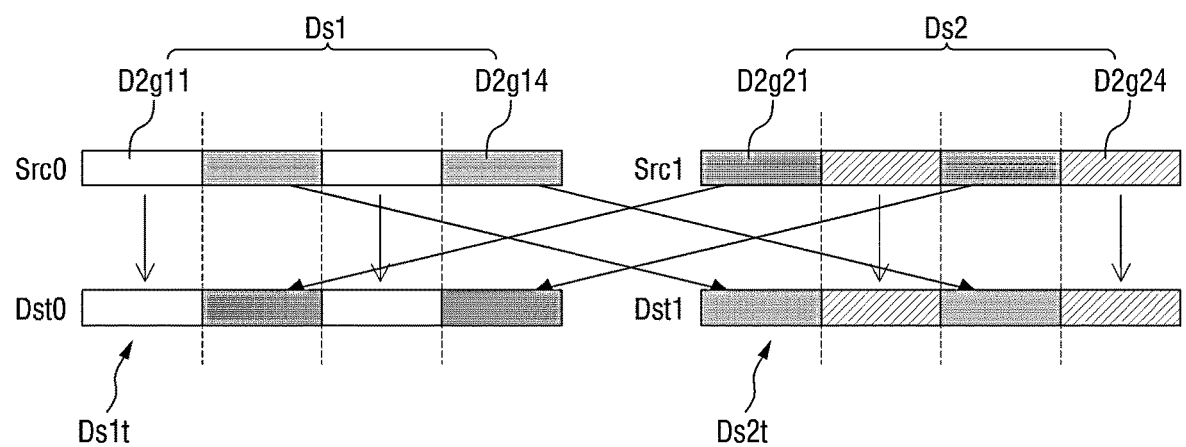
FIG. 15 is a conceptual diagram for illustrating a merge operation of a neural processing device in accordance with some embodiments of the disclosure.

FIG. 15 is a conceptual diagram for illustrating a merge operation of a neural processing device in accordance with some embodiments of the disclosure.

Referring to FIGS. 13A, 13B, and 15, a merge operation may be possible even with smaller-sized granules, unlike FIG. 14. That is, the first input data Ds1 may include four granules including a second data (1_1)th granule D2g11 and a second data (1_4)th granule D2g14. The second input data Ds2 may include four granules including a second data (2_1)th granule D2g21 and a second data (2_4)th granule D2g24.

The transformation logic TL may exchange positions of each of second granule and fourth granule of the first input data Ds1, and the first granule and the third granule of the second input data Ds2. Of course, the positions of each of the first granule and the third granule of the first input data Ds1, and the second granule and the fourth granule of the second input data Ds2 may be exchanged as well, unlike FIG. 15. Through this, the first transformed data Ds1*t* and the second transformed data Ds2*t* may be generated.

As indicated by dotted lines in FIG. 15, the first transformed data Ds1*t* and the second transformed data Ds2*t* may be divided by tiling. Accordingly, each tiled area may be simultaneously transmitted to the processing unit 160 by the output FIFO OF.

If the first input data Ds1 and the second input data Ds2 are 128 bytes, size of each granule may be 32 bytes. However, the embodiment is not limited thereto.

Figure 16:
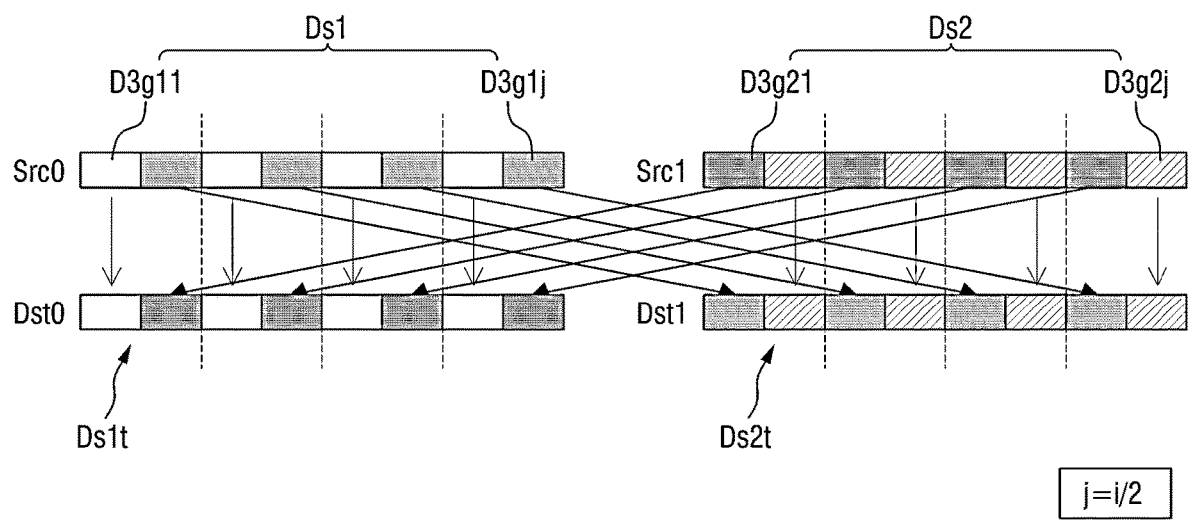
FIG. 16 is a conceptual diagram for illustrating a merge operation of a neural processing device in accordance with some embodiments of the disclosure.

FIG. 16 is a conceptual diagram for illustrating a merge operation of a neural processing device in accordance with some embodiments of the disclosure.

Referring to FIGS. 12, 13A, 13B, and 16, a merge operation may be possible even with smaller-sized granules, unlike FIGS. 14 and 15. That is, the first input data Ds1 may include j granules including a third data (1_1)th granule D3g11 and a third data (1_j)th granule D3g1*j*. The second input data Ds2 may include j granules including a third data (2_1)th granule D3g21 and a third data (2_j)th granule D3g2*j*. In FIG. 16, j is shown as 8, but the embodiment is not limited thereto. j is an even number greater than or equal to 2 and may be twice as large as i in FIG. 12. That is, j may be twice a number of inputs that the processing unit 160 receives simultaneously.

The transformation logic TL may exchange positions of each of the even-numbered granules of the first input data Ds1 and the odd-numbered granules of the second input data Ds2. Of course, the positions of each of the odd-numbered granules of the first input data Ds1 and the even-numbered granules of the second input data Ds2 may be exchanged as well, unlike FIG. 16. Through this, the first transformed data Ds1*t* and the second transformed data Ds2*t* may be generated.

As indicated by dotted lines in FIG. 16, the first transformed data Ds1*t* and the second transformed data Ds2*t* may be divided by tiling. Accordingly, each tiled area may be simultaneously transmitted to the processing unit 160 by the output FIFO OF.

If the first input data Ds1 and the second input data Ds2 are 128 bytes, a size of each granule may be 16 bytes. However, the embodiment is not limited thereto.

As shown in FIGS. 14 to 16, if a size of each granule is an integer multiple of a size of a tiling area or, conversely, if the size of a tiling area is an integer multiple of the size of a granule, the size of the granule may vary as desired.

A merge operation of the transformation logic TL may be a preliminary task for a transpose operation (furthermore, a permute operation) of matrices and vectors that are very frequently used in deep-learning operations. In other words, after performing such a merge operation, each processing element 163_1 of the processing unit 160 can simply change an order of individual elements in each tiling area, thereby completing a transpose operation of matrices and vectors.

Therefore, the embodiment can greatly reduce operation loads and operation time of the processing unit 160 as the local memory load unit 111*a* does not simply perform a load operation but performs a merge operation as a preliminary task for a transpose operation frequently used in deep learning tasks.

In addition, the embodiment can process data efficiently as clock consumed by the transformation logic TL is not large compared to clock required for the load operation.

Figure 17:
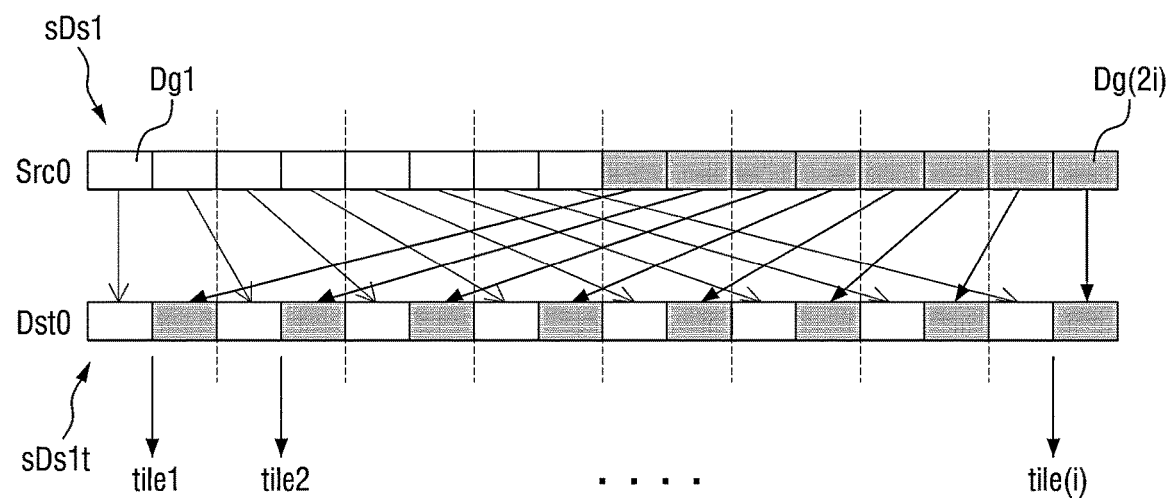
FIG. 17 is a conceptual diagram for illustrating a shuffle operation of the transformation logic of FIG. 13A or 13B.

FIG. 17 is a conceptual diagram for illustrating a shuffle operation of the transformation logic of FIG. 13A or 13B.

Referring to FIG. 13A or 13B and 17, when the transformation logic TL performs a shuffle operation, the input data may include only first shuffle input data sDs1, i.e., one piece of input data. That is, the transformation logic TL may perform the shuffle operation through one piece of input data. In this case, the transformed data, which is a result of the shuffle operation, may also include only first shuffle transformed data sDs1t, i.e., one piece of transformed data. That is, the transformation logic TL may have one input and one output.

The first shuffle input data sDs1 may be inputted to the first source Src0. The first shuffle transformed data sDs1t may be outputted to the first destination Dst0.

The first shuffle input data sDs1 may include 2i pieces of data granules including a first data granule Dg1 and a 2i-th data granule Dg(2i). Each data granule may all be of same size.

The transformation logic TL may exchange an order of data granules. At this time, the transformation logic TL may divide a front part and a rear part based on the point that is a half point of total size of the first shuffle input data sDs1, and sequentially mix the granules of the front part and the rear part, thereby generating the first shuffle transformed data sDs1t. In other words, a first data granule of the front part, a first granule of the rear part, a second granule of the front part, and a second granule of the rear part may become four granules in sequence at the front of the first shuffle transformed data sDs1t. The rear part of the first shuffle transformed data sDs1t may also be arranged in the same way. The first shuffle transformed data sDs1t may also have a same size as the first shuffle input data sDs1.

As indicated by dotted lines in FIG. 17, the first shuffle transformed data sDs1t may be divided via tiling. Accordingly, each tiled area may be simultaneously transmitted to the processing unit 160 by the output FIFO OF. A number of these tiled areas may be equal to a number of FIFOs in the output FIFO OF. If the first input data Ds1 and the second input data Ds2 are 128 bytes, a size of each granule may be 8 bytes. However, the embodiment is not limited thereto.

Figure 18:
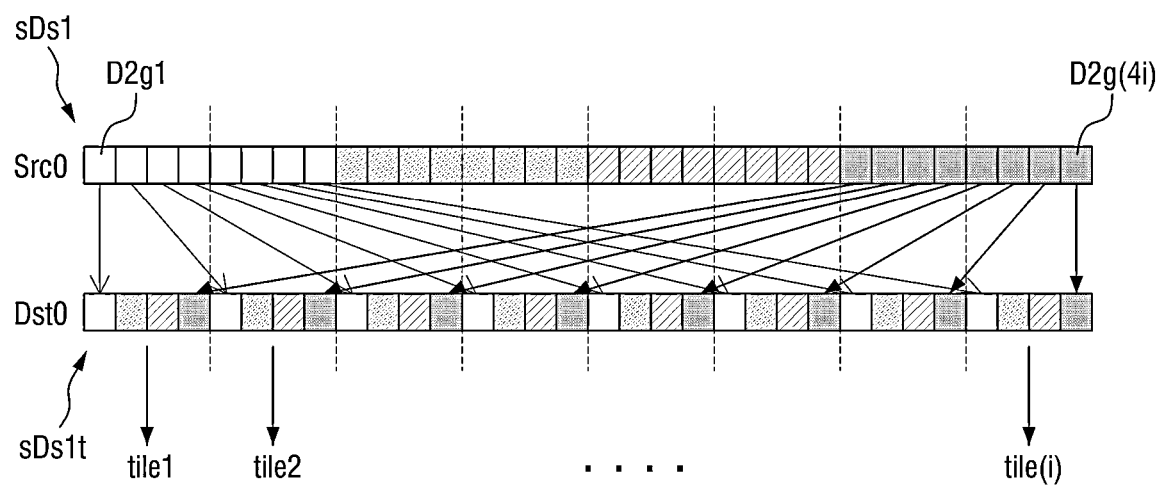
FIG. 18 is a conceptual diagram for illustrating a shuffle operation of a neural processing device in accordance with some embodiments of the disclosure.

FIG. 18 is a conceptual diagram for illustrating a shuffle operation of a neural processing device in accordance with some embodiments of the disclosure.

Referring to FIGS. 12, 13A, 13B, and 18, a shuffle operation may be possible even with smaller-sized granules, unlike FIG. 17. That is, the first shuffle input data sDs1 may include 4i granules including a (2_1)th data granule D2g1 and a (2_4i)th data granule D2g(4i). In FIG. 18, 4i is shown as 32, but the embodiment is not limited thereto. Said i is same i in FIG. 12 and may be a number of inputs that the processing unit 160 receives simultaneously.

The transformation logic TL may exchange an order of data granules. At this time, the transformation logic TL may divide a front part and a rear part based on the point that is a half point of total size of the first shuffle input data sDs1, and sequentially mix the granules of the front part and the rear part, thereby generating the first shuffle transformed data sDs1t.

As indicated by dotted lines in FIG. 18, the first transformed data Ds1t and the second transformed data Ds2t may be divided by tiling. Accordingly, each tiled area may be simultaneously transmitted to the processing unit 160 by the output FIFO OF.

If the first input data Ds1 and the second input data Ds2 are 128 bytes, a size of each granule may be 4 bytes. However, the embodiment is not limited thereto.

As shown in FIGS. 17 and 18, if a size of each granule is an integer multiple of a size of a tiling area or, conversely, if the size of a tiling area is an integer multiple of the size of a granule, the size of the granule may vary as desired.

A shuffle operation of the transformation logic TL may be an unpack operation that is very frequently used in deep-learning operations. The unpack operation may perform a function of uniformly distributing significant data (which has non-zero value) in order to increase data operation efficiency when the significant data are skewed to one side.

In particular, the neural processing device 1 of the disclosure tiles data, then inputs the tiled data to multiple operators and thus can increase storage efficiency when the significant data are packed and stored. Further, the neural processing device 1 of the disclosure unpacks again, distributes the significant data to a plurality of operators such as the processing element 163_1 or the compute unit CU, and performs operations in parallel, thus can increase operation efficiency. For example, if inputted data is 128 bytes and eight operators are used, each data of 16 bytes may separately enter the respective operators. At this time, if the significant data is less than 128 bytes, it is possible to achieve maximization of storage efficiency and operation efficiency of each operator by packing and unpacking.

Therefore, the embodiment can maximize storage efficiency and operation efficiency of data as the local memory load unit 111a does not simply perform a load operation but performs a shuffle operation for an unpack operation frequently used in deep-learning tasks. In addition, the embodiment can process data efficiently as clock consumed by the transformation logic TL is not large compared to clock required for the load operation in the shuffle operation as well.

Figure 19:
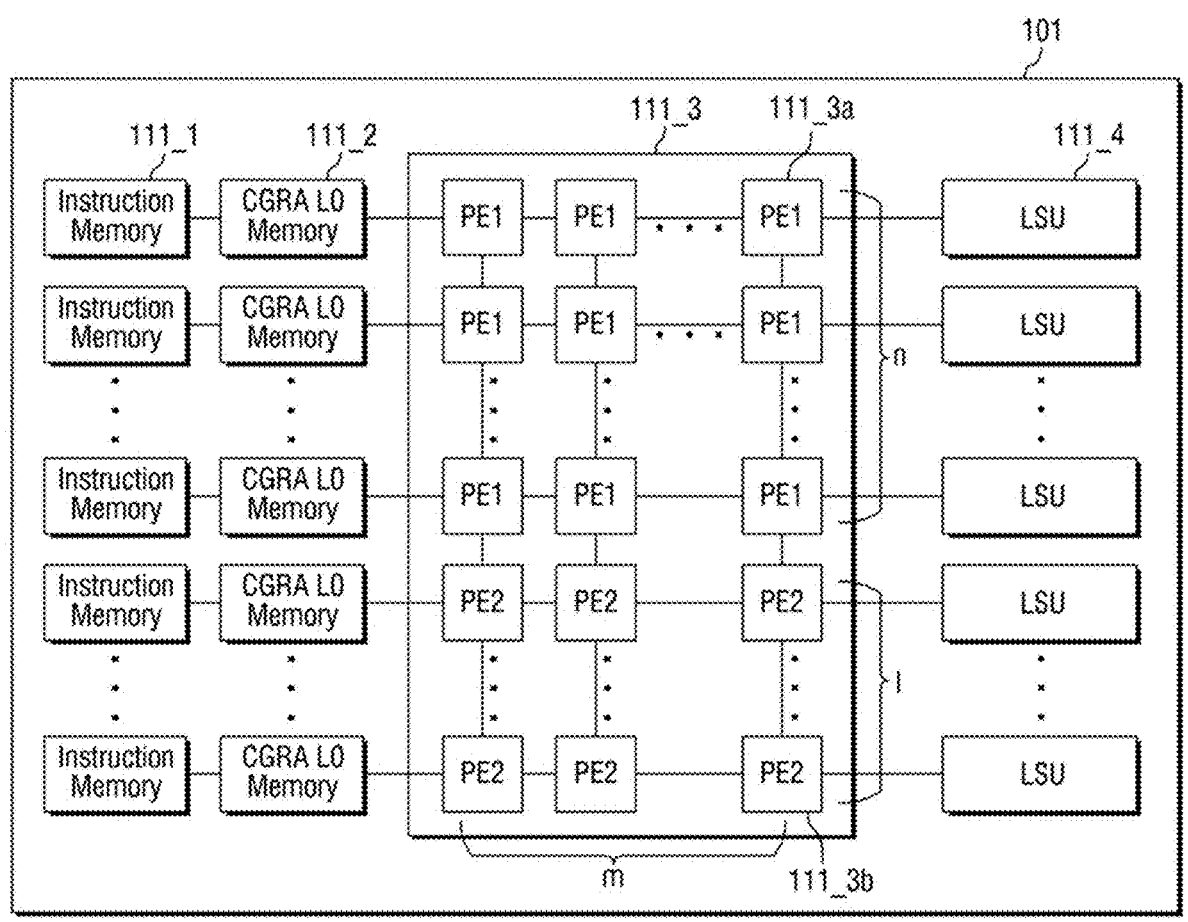
FIG. 19 is a block diagram for illustrating the structure of the neural processing device of FIG. 1 in detail.

FIG. 19 is a block diagram for illustrating in detail the structure of the neural processing device in accordance with some embodiments of the disclosure.

Referring to FIG. 19, a neural core 101 may have a CGRA structure, unlike a neural core 100. The neural core 101 may include an instruction memory 111_1, a CGRA L0 memory 111_2, a PE array 111_3, and a load/store unit (LSU) 111_4. The PE array 111_3 may include a plurality of processing elements interconnected by a mesh style network. The mesh style network may be two-dimensional, three-dimensional, or higher-dimensional. In the CGRA, the plurality of processing elements may be reconfigurable or programmable. The interconnection between the plurality of processing elements may be reconfigurable or programmable. In some embodiments, the interconnection between the plurality of processing elements may be statically reconfigurable or programmable when the interconnection is fixed after the plurality of processing elements are configured or programed. In some embodiments, the interconnection between the plurality of processing elements may be dynamically reconfigurable or programmable when the interconnection is reconfigurable or programmable even after the plurality of processing elements are configured or programed.

The instruction memory 111_1 may receive and store instructions. The instruction memory 111_1 may sequentially store instructions internally, and provide the stored instructions to the PE array 111_3. In this case, the instructions may instruct the operation of first type of a plurality of processing elements 111_3a included in each PE array 111_3.

The CGRA L0 memory 111_2 may be located inside the neural core 101, receive all input data required for tasks of the neural core 101, and temporarily store the data. In addition, the CGRA L0 memory 111_2 may temporarily store output data calculated by the neural core 101 to transmit the data to the outside. The CGRA L0 memory 111_2 may serve as a cache memory of the neural core 101.

The CGRA L0 memory 111_2 may send and receive data to and from the PE array 111_3. The CGRA L0 memory 111_2 may be a memory corresponding to L0 (level 0) that is lower than L1. In this case, the L0 memory may be a private memory of the neural core 101 that is not shared. The CGRA L0 memory 111_2 may transmit data such as activations or weights, programs, and the like to the PE array 111_3.

The PE array 111_3 may be a module that performs calculations. The PE array 111_3 may perform not only one-dimensional calculations but also two-dimensional or higher matrix/tensor calculations. The PE array 111_3 may include the first type of the plurality of processing elements 111_3a and a second type of a plurality of processing elements 111_3b therein.

The first type of the plurality of processing elements 111_3a and the second type of the plurality of processing elements 111_3b may be arranged in rows and columns. The first type of the plurality of processing elements 111_3a and the second type of the plurality of processing elements 111_3b may be arranged in m columns. In addition, the first type of the plurality of processing elements 111_3a may be arranged in n rows, and the second type of the plurality of processing elements 111_3b may be arranged in 1 rows. Accordingly, the first type of the plurality of processing elements 111_3a and the second type of the plurality of processing element 111_3b may be arranged in (n+1) rows and m columns.

The LSU 111_4 may receive at least one of data, a control signal, or a synchronization signal from the outside via the local interconnection 200. The LSU 111_4 may transmit at least one of the received data, control signal, or synchronization signal to the CGRA L0 memory 111_2. Similarly, the LSU 111_4 may transfer at least one of the data, control signal, or synchronization signal to the outside via the local interconnection 200.

The neural core 101 may have a CGRA (Coarse Grained Reconfigurable Architecture) structure. Accordingly, in the neural core 101, each of the first type of the plurality of processing elements 111_3a and the second type of the plurality of processing elements 111_3b of the PE array 111_3 may be connected to at least one of the CGRA L0 memory 111_2, the instruction memory 111_1, or the LSU 111_4, respectively. In other words, the first type of the plurality of processing elements 111_3a and the second type of the plurality of processing elements 111_3b do not have to be connected to all of the CGRA L0 memory 111_2, the instruction memory 111_1, and the LSU 111_4, but may be connected to some thereof.

Further, the first type of the plurality of processing elements 111_3a and the second type of the plurality of processing elements 111_3b may be different types of processing elements from each other. Accordingly, out of the CGRA L0 memory 111_2, the instruction memory 111_1, and the LSU 111_4, the elements connected to the first type of the plurality of processing elements 111_3a and the elements connected to the second type of the plurality of processing elements 111_3b may be different from each other.

The neural core 101 of the disclosure having a CGRA structure enables high-level parallel calculations, and since direct data exchange between the first type of the plurality of processing elements 111_3a and the second type of the plurality of processing elements 111_3b is possible, the power consumption may be low. In addition, by including two or more types of processing elements, optimization according to various calculation tasks may also be possible.

For example, if the first type of the plurality of processing elements 111_3a are processing elements that perform two-dimensional calculations, the second type of the plurality of processing elements 111_3b may be processing elements that perform one-dimensional calculations. However, the embodiment is not limited thereto.

Figure 20:
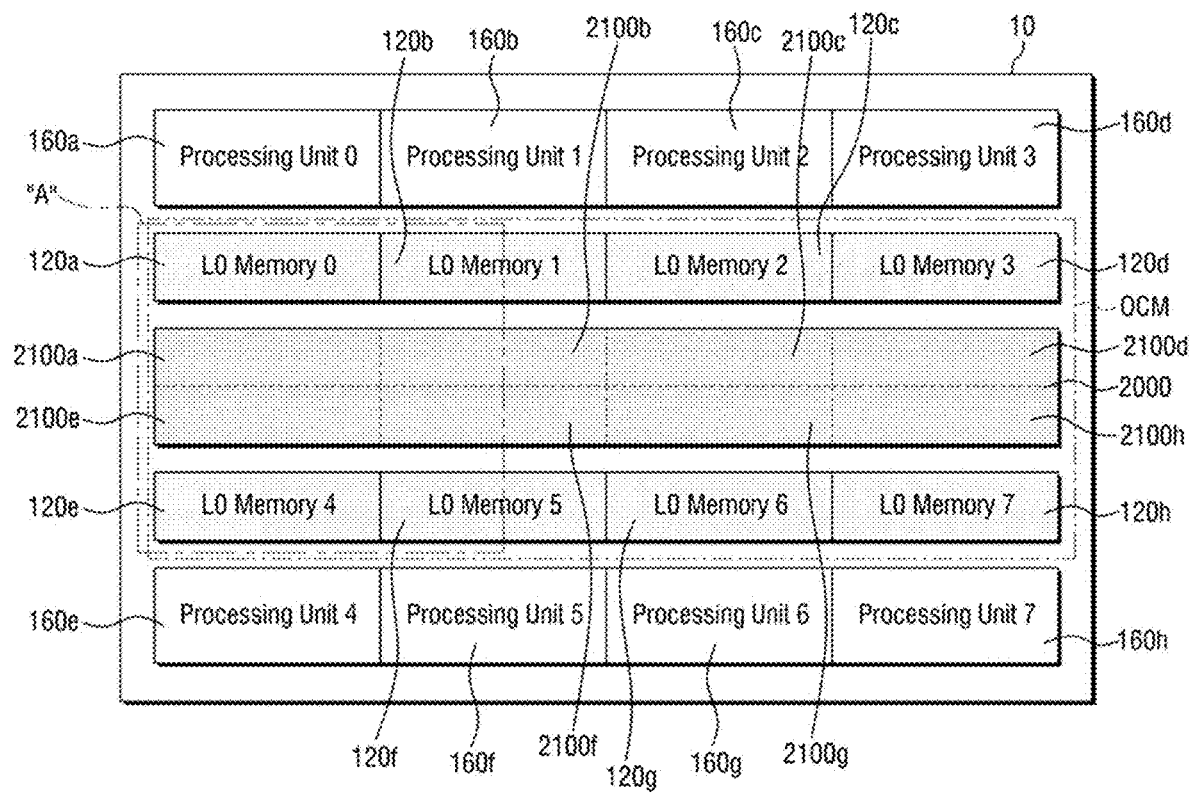
FIG. 20 is a block diagram for illustrating the memory reconstruction of the neural processing system of FIG. 1.

FIG. 20 is a block diagram for illustrating memory reconfiguration of a neural processing system in accordance with some embodiments of the disclosure.

Referring to FIG. 20, the neural core SoC 10 may include first to eighth processing units 160a to 160h and an on-chip memory OCM. Although FIG. 20 illustrates eight processing units as an example, this is merely illustrative, and the number of processing units may vary as desired.

The on-chip memory OCM may include first to eighth L0 memories 120a to 120h and a shared memory 2000.

The first to eighth L0 memories 120a to 120h may be used as private memories for the first to eighth processing units 160a to 160h, respectively. In other words, the first to eighth processing units 160a to 160h and the first to eighth L0 memories 120a to 120h may correspond to each other 1:1.

The shared memory 2000 may include first to eighth memory units 2100a to 2100h. The first to eighth memory units 2100a to 2100h may correspond to the first to eighth processing units 160a to 160h and the first to eighth L0 memories 120a to 120h, respectively. That is, the number of memory units may be eight, which is the same as the number of processing units and L0 memories.

The shared memory 2000 may operate in one of two kinds of on-chip memory types. In other words, the shared memory 2000 may operate in one of a L0 memory type or a global memory type. In other words, the shared memory 2000 may implement two types of logical memories with one piece of hardware.

If the shared memory 2000 is implemented in the L0 memory type, the shared memory 2000 may operate as a private memory for each of the first to eighth processing units 160a to 160h, just like the first to eighth L0 memories 120a to 120h. The L0 memory can operate at a relatively higher clock speed compared with the global memory, and the shared memory 2000 may also use a relatively higher clock speed when operating in the L0 memory type.

If the shared memory 2000 is implemented in the global memory type, the shared memory 2000 may operate as a common memory used by the first processing unit 160a and the second processing unit 160b together. In this case, the shared memory 2000 may be shared not only by the first to eighth processing units 160a to 160h but also by the first to eighth L0 memories 120a to 120h.

The global memory may generally use a lower clock compared with the L0 memory, but is not limited thereto. When the shared memory 2000 operates in the global memory type, the first to eighth processing units 160a to 160h may share the shared memory 2000. In this case, the shared memory 2000 may be connected to the volatile memory 32 of FIG. 2 via the global interconnection 6000 and may also operate as a buffer for the volatile memory 32.

At least part of the shared memory 2000 may operate in the L0 memory type, and the rest may operate in the global memory type. In other words, the entire shared memory 2000 may operate in the L0 memory type, or the entire shared memory 2000 may operate in the global memory type. Alternatively, part of the shared memory 2000 may operate in the L0 memory type, and the rest may operate in the global memory type.

Figure 21:
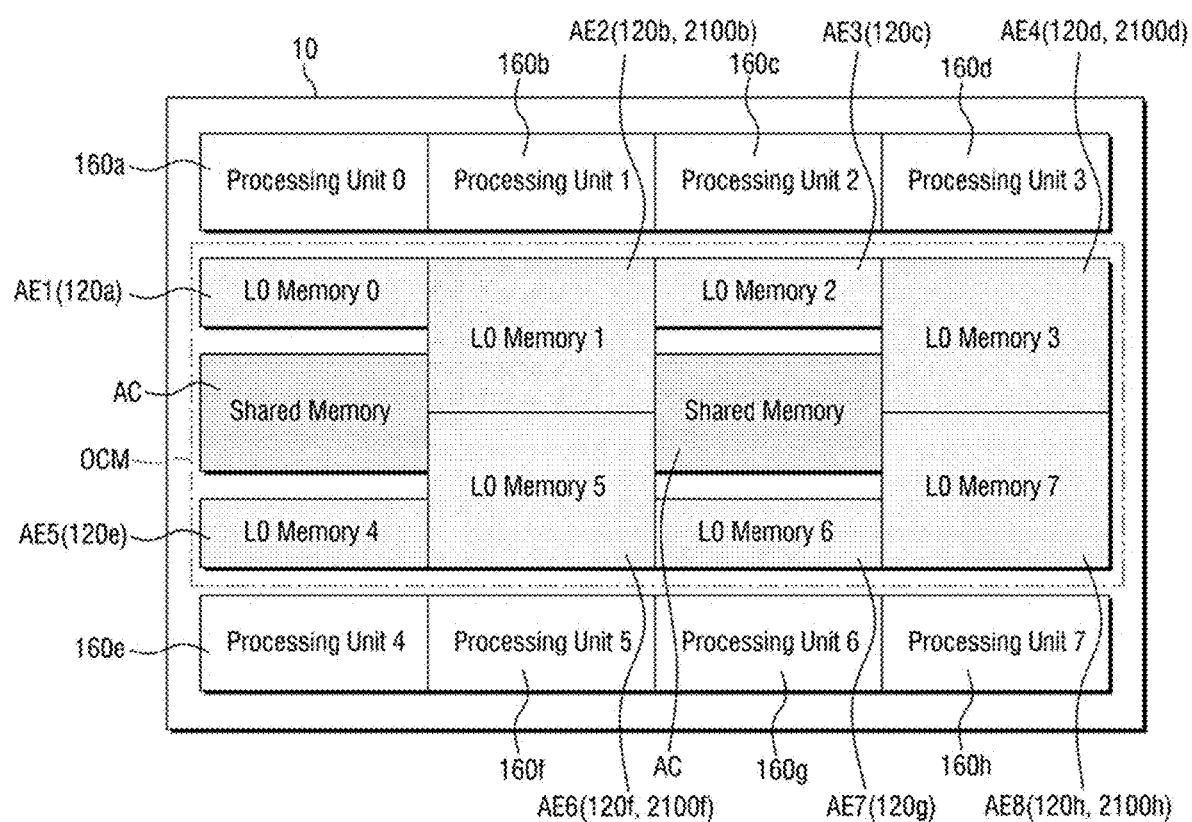
FIG. 21 is a block diagram for illustrating an example of the memory reconstruction of the neural processing system of FIG. 1.

FIG. 21 is a block diagram showing an example of memory reconstruction of a neural processing system in accordance with some embodiments of the disclosure.

With reference to FIGS. 20 and 21, first, third, fifth, and seventh dedicated areas AE1, AE3, AE5, and AE7 for each of the first, third, fifth, and seventh processing units 160a, 160c, 160e, and 160g may include only the first, third, fifth, and seventh L0 memories 120a, 120c, 120e, and 120g, respectively. Further, second, fourth, sixth, and eighth dedicated areas AE2, AE4, AE6, and AE8 for each of the second, fourth, sixth, and eighth processing units 160b, 160d, 160f, and 160h may include second, fourth, sixth, and eighth L0 memories 120b, 120d, 120f, and 120h, respectively. In addition, the second, fourth, sixth, and eighth dedicated areas AE2, AE4, AE6, and AE8 may include the second, fourth, sixth, and eighth memory units 2100b, 2100d, 2100f, and 2100h. The first, third, fifth, and seventh memory units 2100a, 2100c, 2100e, and 2100g of the shared memory 2000 may be used as a common area AC.

The common area AC may be a memory shared by the first to eighth processing units 160a to 160h. The second dedicated area AE2 may include a second L0 memory 120b and a second memory unit 2100b. The second dedicated area AE2 may be an area in which the second L0 memory 120b and the second memory unit 210b that are separated hardware-wise operate in the same manner and operate logically as one L0 memory. The fourth, sixth, and eighth dedicated areas AE4, AE6, and AE8 may also operate in the same manner as the second dedicated area AE2.

The shared memory 2000 in accordance with the embodiment may convert an area corresponding to each processing unit into a logical L0 memory and a logical global memory of an optimized ratio and may use them. The shared memory 2000 may perform the adjustment of this ratio at runtime.

That is, each processing unit may perform the same task in some cases, but may perform different tasks in other cases as well. In this case, the amount of the L0 memory and the amount of the global memory required for the tasks carried out by each processing unit are inevitably different each time. Accordingly, if the composition ratio of the L0 memory and the shared memory is fixedly set as in the conventional on-chip memory, there may occur inefficiency due to the calculation tasks assigned to each processing unit.

Therefore, the shared memory 2000 of the neural processing device in accordance with the embodiment may set an optimal ratio of the L0 memory and the global memory according to calculation tasks during the runtime, and may enhance the efficiency and speed of calculation.

Figure 22:
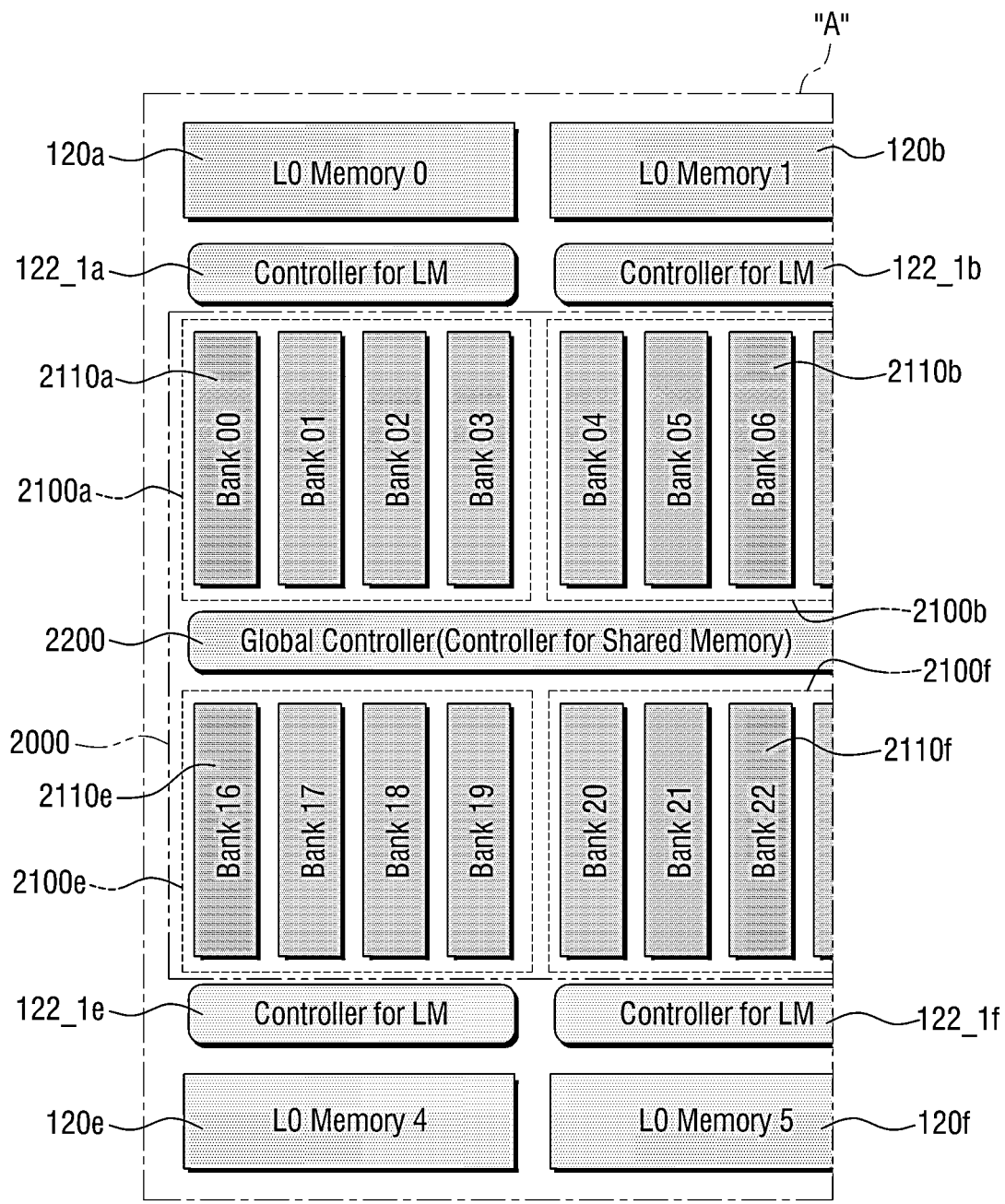
FIG. 22 is an enlarged block diagram of a portion A of FIG. 20.

FIG. 22 is an enlarged block diagram of a portion A of FIG. 20.

With reference to FIGS. 20 and 22, the shared memory 2000 may include a first L0 memory controller 122_1a, a second L0 memory controller 122_1b, a fifth L0 memory controller 122_1e, a sixth L0 memory controller 122_1f, the first to eighth memory units 2100a to 2100h, and a global controller 2200. Other L0 memory controllers not shown may also be included in the embodiment, but the description thereof will be omitted for convenience.

The first L0 memory controller 122_1a, the second L0 memory controller 122_1b, the fifth L0 memory controller 122_1e, the sixth L0 memory controller 122_1f, and the global controller 2200 may be referred to respectively as a first L0 memory controller circuit, a second L0 memory controller circuit, a fifth L0 memory controller circuit, a sixth L0 memory controller circuit, and a global controller circuit. However, for the sake of convenience, the terms are respectively unified as a first L0 memory controller, a second L0 memory controller, a fifth L0 memory controller, a sixth L0 memory controller, and a global controller. In addition, the first L0 memory controller 122_1a, the second L0 memory controller 122_1b, the fifth L0 memory controller 122_1e, the sixth L0 memory controller 122_1f, and the global controller 2200 may each be implemented as a circuit or circuitry.

The first L0 memory controller 122_1a may control the first L0 memory 120a. In addition, the first L0 memory controller 122_1a may control the first memory unit 2100a. Specifically, when the first memory unit 2100a is implemented in a logical L0 memory type, the control by the first L0 memory controller 122_1a may be performed on the first memory unit 2100a.

The second L0 memory controller 122_1b may control the second L0 memory 120b. Further, the second L0 memory controller 122_1b may control the second memory unit 2100b. In other words, when the second memory unit 2100b is implemented in the logical L0 memory type, the control by the first L0 memory controller 122_1a may be performed on the second memory unit 2100b.

The fifth L0 memory controller 122_1e may control the fifth L0 memory 120e. Further, the fifth L0 memory controller 122_1e may control the fifth memory unit 2100e. In other words, when the fifth memory unit 2100e is implemented in the logical L0 memory type, the control by the fifth L0 memory controller 122_1e may be performed on the fifth memory unit 2100e.

The sixth L0 memory controller 122_1f may control the sixth L0 memory 120f. Further, the sixth L0 memory controller 122_1f may control the sixth memory unit 2100f. In other words, when the sixth memory unit 2100f is implemented in the logical L0 memory type, the control by the sixth L0 memory controller 122_1f may be performed on the sixth memory unit 2100f.

The global controller 2200 may control all of the first to eighth memory units 2100a to 2100h. Specifically, the global controller 2200 may control the first memory unit 2100a to the eighth memory unit 2100h when the first to eighth memory units 2100a to 2100h each operate logically in the global memory type (i.e., when they do not operate logically in the L0 memory type).

In other words, the first to eighth memory units 2100a to 2100h may be controlled by the first to eighth L0 memory controllers 122_1a to 122_1h, respectively, or may be controlled by the global controller 2200, depending on what type of memory they are logically implemented.

If the L0 memory controllers including the first, second, fifth, and sixth L0 memory controllers 122_1a, 122_1b, 122_1e, and 122_1f control the first to eighth memory units 2100a to 2100h, respectively, the first to eighth L0 memory controllers 122_1a to 122_1h control the first to eighth memory units 2100a to 2100h in the same manner as the first to eighth L0 memories 120a to 120h, and thus, can control them as the private memory of the first to eighth processing units 160a to 160h. Accordingly, the first to eighth memory units 2100a to 2100h may operate at clock frequencies corresponding to the clock frequencies of the first to eighth processing units 160a to 160h.

The L0 memory controllers including the first L0 memory controller 122_1a, the second L0 memory controller 122_1b, the fifth L0 memory controller 122_1e, and the sixth L0 memory controller 122_1f may each include the LSU 110 of FIG. 7.

If the global controller 2200 controls at least one of the first to eighth memory units 2100a to 2100h, respectively, then the global controller 2200 may control the first to eighth memory units 2100a to 2100h as the global memory of the first to eighth processing units 160a to 160h, respectively. Accordingly, at least one of the first to eighth memory units 2100a to 2100h may operate at a clock frequency independent of the clock frequencies of the first to eighth processing units 160a to 160h, respectively. In some embodiments, if the global controller 2200 controls the i-th memory unit among the first to eighth memory units 2100a to 2100h, the global controller 2200 may control the i-th memory unit as the global memory of the i-th processing unit, and the i-th memory unit may operate at a clock frequency independent of the clock frequency of the i-th processing unit. However, the embodiment is not limited thereto.

The global controller 2200 may connect the first to eighth memory units 2100a to 2100h to the global interconnection 6000 of FIG. 3. The first to eighth memory units 2100a to 2100h may exchange data with the off-chip memory 30 of FIG. 2 by the control of the global controller 2200 or may respectively exchange data with the first to eighth L0 memories 120a to 120h.

Each of the first to eighth memory units 2100a to 2100h may include at least one memory bank. The first memory unit 2100a may include at least one first memory bank 2110a. The first memory banks 2110a may be areas obtained by dividing the first memory unit 2100a into certain sizes. The first memory banks 2110a may all be memory devices of the same size. However, the embodiment is not limited thereto. FIG. 22 illustrates that four memory banks are included in one memory unit.

Similarly, the second, fifth, and sixth memory units 2100b, 2100e, and 2100f may include at least one second, fifth, and sixth memory banks 2110b, 2110e, and 2110f, respectively.

In the following, the description will be made based on the first memory banks 2110a and the fifth memory banks 2110e, which may be the same as other memory banks including the second and sixth memory banks 2110b and 2110f.

The first memory banks 2110a may each operate logically in the L0 memory type or operate logically in the global memory type. In this case, the first memory banks 2110a may operate independently of the other memory banks in the first memory unit 2100a. However, the embodiment is not limited thereto.

If each memory bank operates independently, the first memory unit 2100a may include a first area operating in the same manner as the first L0 memory 120a and a second area operating in a different manner from the first L0 memory 120a. In this case, the first area and the second area do not necessarily coexist, but any one area may take up the entire first memory unit 2100a.

Likewise, the second memory unit 2100b may include a third area operating in the same manner as the second L0 memory 120b and a fourth area operating in a different manner from the second L0 memory 120b. In this case, the third area and the fourth area do not necessarily coexist, and any one area may take up the entire first memory unit 2100a.

In this case, the ratio of the first area to the second area may be different from the ratio of the third area to the fourth area. However, the embodiment is not limited thereto. Therefore, the ratio of the first area to the second area may be the same as the ratio of the third area to the fourth area. In other words, the memory composition ratio in each memory unit may vary as desired.

In general, in the case of the conventional system-on-chip, the on-chip memory except for high-speed L0 memory was often composed of high-density, low-power SRAM. This is because SRAM has high efficiency in terms of chip area and power consumption relative to required capacity. However, with the conventional on-chip memory, the processing speed slowed down significantly as was inevitable in the case where tasks that require more data quickly than the predetermined capacity of the L0 memory, and, even when the need for the global memory is not great, there is no way to utilize the remaining global memory, resulting in inefficiency.

On the other hand, the shared memory 2000 in accordance with some embodiments of the disclosure may be controlled selectively by any one of the two controllers depending on the case. In the case depicted, the shared memory 2000 may be controlled not only as a whole by a determined one of the two controllers but also independently for each memory unit or each memory bank.

Through this, the shared memory 2000 in accordance with the embodiment can obtain an optimal memory composition ratio according to calculation tasks during the runtime and can perform faster and more efficient calculation tasks. In the case of a processing unit specialized in artificial intelligence, the required sizes of L0 memory and global memory may vary for each particular application. Moreover, even for the same application, the required sizes of L0 memory and global memory may vary for each layer when a deep learning network is used. In the shared memory 2000, in accordance with the embodiment, the composition ratio of the memory can be changed during runtime even when calculation steps change according to each layer, making fast and efficient deep learning tasks possible.

Figure 23:
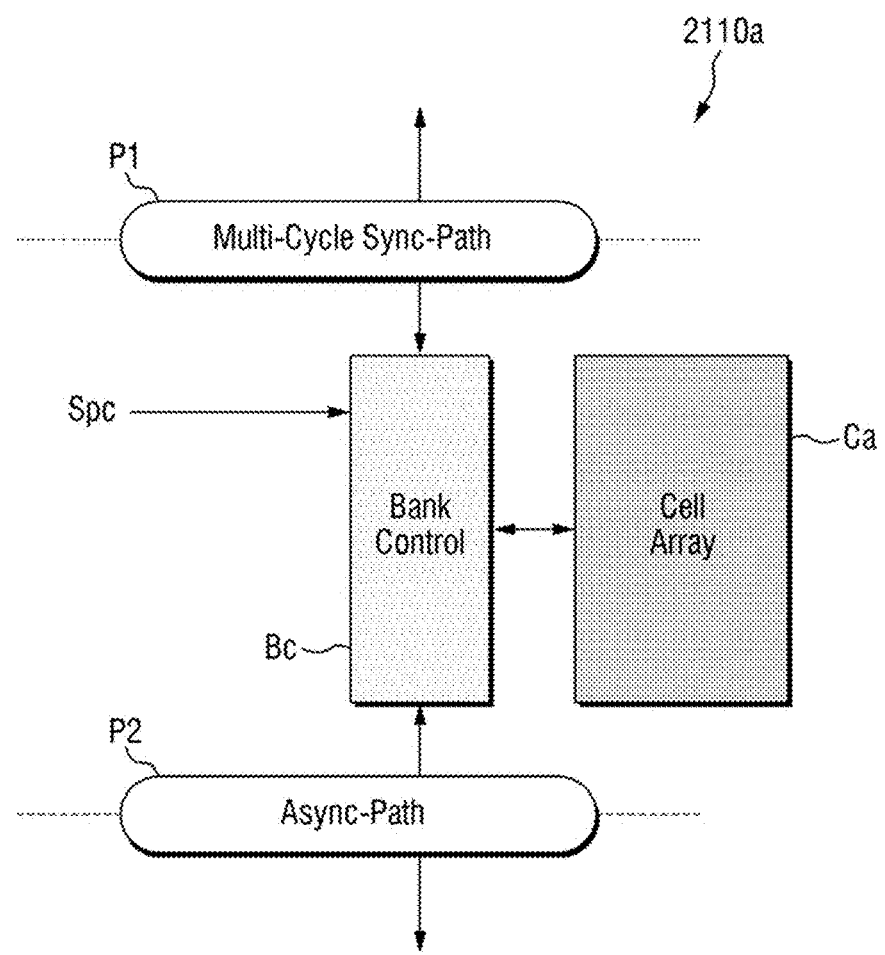
FIG. 23 is a diagram for illustrating the first memory bank of FIG. 22 in detail.

FIG. 23 is a diagram for illustrating the first memory bank of FIG. 22 in detail.

Although FIG. 23 illustrates the first memory bank 2110a, other memory banks may also have the same structure as the first memory bank 2110a.

Referring to FIG. 23, the first memory bank 2110a may include a cell array Ca, a bank controller Bc, a first path unit P1, and a second path unit P2.

In this case, the bank controller Bc, the first path unit P1, and the second path unit P2 may be referred to respectively as a bank controller circuit, a first path unit circuit, and a second path unit circuit. However, for the sake of convenience, the terms are respectively unified as a bank controller, a first path unit, and a second path unit. In addition, the bank controller Bc, the first path unit P1, and the second path unit P2 may each be implemented as a circuit or circuitry.

The cell array Ca may include a plurality of memory devices (cells) therein. In the cell array Ca, the plurality of memory devices may be arranged in a lattice structure. The cell array Ca may be, for example, a SRAM (static random-access memory) cell array.

The bank controller Bc may control the cell array Ca. The bank controller Bc may determine whether the cell array Ca operates in the L0 memory type or in the global memory type, and may control the cell array Ca according to the determined memory type.

Specifically, the bank controller Bc may determine whether to transmit and receive data in the direction of the first path unit P1 or to transmit and receive data in the direction of the second path unit P2 during the runtime. The bank controller Bc may determine a data transmission and reception direction according to a path control signal Spc.

The path control signal Spc may be generated by a pre-designed device driver or compiler. The path control signal Spc may be generated according to the characteristics of calculation tasks. Alternatively, the path control signal Spc may be generated by an input received from a user. In other words, the user may directly apply an input to the path control signal Spc in order to select optimal memory composition ratio.

The bank controller Bc may determine a path along which the data stored in the cell array Ca are transmitted and received via the path control signal Spc. The exchange interface of data may be changed as the bank controller Bc determines the path along which the data are transmitted and received. In other words, a first interface may be used when the bank controller Bc exchanges data with the first path unit P1, and a second interface may be used when the bank controller Bc exchanges data with the second path unit P2. In this case, the first interface and the second interface may be different from each other.

Also, address systems in which data are stored may vary as well. In other words, if a particular interface is selected, then read and write operations may be performed in an address system corresponding thereto.

The bank controller Bc may operate at a particular clock frequency. For example, if the cell array Ca is an SRAM cell array, the bank controller Bc may operate at the operating clock frequency of a general SRAM.

The first path unit P1 may be connected to the bank controller Bc. The first path unit P1 may directly exchange the data of the cell array Ca with the first processing unit 160a. In this case, "directly" may mean being exchanged with each other without going through the global interconnection 6000. In other words, the first processing unit 160a may exchange data directly with the first L0 memory 120a, and the first processing unit 160a may exchange data via the first path unit P1 when the shared memory 2000 is implemented logically in the L0 memory type. The first path unit P1 may include L0 memory controllers including the first L0 memory controller 122_1a and the second L0 memory controller 122_1b as shown in FIG. 23.

The first path unit P1 may form a multi-cycle sync-path. In other words, the operating clock frequency of the first path unit P1 may be the same as the operating clock frequency of the first processing unit 160a. The first L0 memory 120a may quickly exchange data at the same clock frequency as the operating clock frequency of the first processing unit 160a in order to quickly exchange data at the same speed as the operation of the first processing unit 160a. Likewise, the first path unit P1 may also operate at the same clock frequency as the operating clock frequency of the first processing unit 160a.

In this case, the operating clock frequency of the first path unit P1 may be multiples of the operating clock frequency of the bank controller Bc. In this case, a clock domain crossing (CDC) operation for synchronizing the clocks between the bank controller Bc and the first path unit P1 is not required separately, and thus, a delay of data transmission may not occur. Accordingly, faster and more efficient data exchange can be possible.

In the embodiment shown in FIG. 23, an operating clock frequency of the first path unit P1 may be 1.5 GHz, as an example. This may be twice the frequency of 750 MHz of the bank controller Bc. However, the embodiment is not limited thereto, and any operating clock frequency of the first path unit P1 may be possible as long as the first path unit P1 operates at integer multiples of the clock frequency of the bank controller Bc.

The second path unit P2 may be connected to the bank controller Bc. The second path unit P2 may exchange the data of the cell array Ca with the first processing unit 160a not directly but via the global interconnection 6000. In other words, the first processing unit 160a may exchange data with the cell array Ca via the global interconnection 6000 and the second path unit P2. In this case, the cell array Ca may exchange data not only with the first processing unit 160a but also with other processing units.

In other words, the second path unit P2 may be a data exchange path between the cell array Ca and all the processing units when the first memory bank 2110a is implemented logically in the global memory type. The second path unit P2 may include the global controller 2200 of FIG. 22.

The second path unit P2 may form an asynchronous path or Async-Path. The operating clock frequency of the second path unit P2 may be the same as the operating clock frequency of the global interconnection 6000. Likewise, the second path unit P2 may also operate at the same clock frequency as the operating clock frequency of the global interconnection 6000.

In the case of the embodiment as shown in FIG. 23, the operating clock frequency of the second path unit P2 may not be synchronized with the operating clock frequency of the bank controller Bc. In this case, the clock domain crossing (CDC) operation for synchronizing the clocks between the bank controller Bc and the second path unit P2 may be required. If the operating clock frequency of the bank controller Bc and the operating clock frequency of the second path unit P2 are not synchronized with each other, the degree of freedom in the design of the clock domain may be relatively high. Therefore, the difficulty of hardware design is decreased, thereby making it possible to more easily derive the desired hardware operation.

The bank controller Bc may use different address systems in the case of exchanging data via the first path unit P1 and in the case of exchanging data via the second path unit P2. In other words, the bank controller Bc may use a first address system if exchanging data via the first path unit P1 and a second address system if exchanging data via the second path unit P2. In this case, the first address system and the second address system may be different from each other.

A bank controller Bc is not necessarily required for each memory bank. In other words, a bank controller Bc may not be used to schedule, but instead serves to transfer signals, and thus, is not a required component for each memory bank having two ports. Therefore, one bank controller Bc can be operably coupled to control multiple memory banks. The multiple memory banks may operate independently even if they are controlled by the bank controller Bc. However, the embodiment is not limited thereto.

As a matter of course, the bank controller Bc may exist for each memory bank. In this case, the bank controller Bc may control each memory bank individually.

Referring to FIG. 22 and FIG. 23, if the first memory unit 2100a exchanges data via the first path unit P1, the first address system may be used. If the first memory unit 2100a exchanges data via the second path unit P2, the second address system may be used. Similarly, if the second memory unit 2100b exchanges data via the first path unit P1, a third address system may be used. If the second memory unit 2100b exchanges data via the second path unit P2, the second address system may be used. In this case, the first address system and the third address system may be the same as each other. However, the embodiment is not limited thereto.

The first address system and the third address system may each be used exclusively for the first processing unit 160a and the second processing unit 160b, respectively. The second address system may be commonly applied to the first processing unit 160a and the second processing unit 160b.

In FIG. 23, the operating clock frequency of the second path unit P2 may operate at 1 GHz, as an example. This may be a frequency that is not synchronized with the operating clock frequency of 750 MHz of the bank controller Bc. In other words, the operating clock frequency of the second path unit P2 may be freely set without being dependent on the operating clock frequency of the bank controller Bc at all.

A generic global memory has used slow SRAM (e.g., 750 MHz) and a global interconnection (e.g., 1 GHz) faster than that, inevitably resulting in delays due to the CDC operation. On the other hand, the shared memory 2000 in accordance with some embodiments has room to use the first path unit P1 in addition to the second path unit P2, thereby making it possible to avoid delays resulting from the CDC operation.

Furthermore, in the generic global memory, a plurality of processing units use one global interconnection 6000, and thus, when an amount of data transfer occurs at the same time, the decrease in the overall processing speed is likely to occur. On the other hand, the shared memory 2000 in accordance with some embodiments has room to use the first path unit P1 in addition to the second path unit P2, thereby making it possible to achieve the effect of properly distributing the data throughput that could be concentrated on the global controller 2200 as well.

Figure 24:
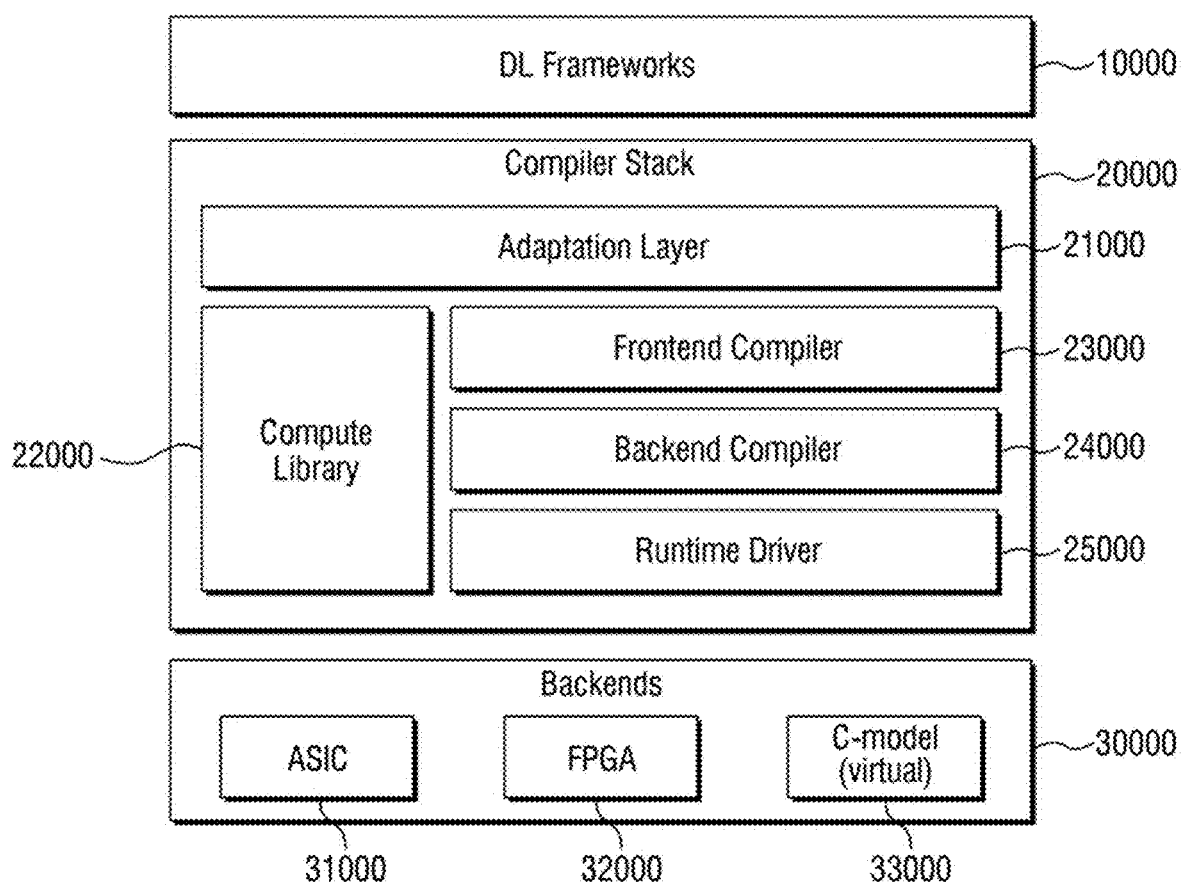
FIG. 24 is a block diagram for illustrating a software hierarchy of a neural processing device in accordance with some embodiments of the disclosure.

FIG. 24 is a block diagram for illustrating a software hierarchy of a neural processing device in accordance with some embodiments.

Referring to FIG. 24, the software hierarchy of the neural processing device in accordance with some embodiments may include a deep learning (DL) framework 10000, a compiler stack 20000, and a back-end module 30000.

The DL framework 10000 may mean a framework for a deep learning model network used by a user. For example, a neural network that has finished training may be generated using a program such as TensorFlow or PyTorch.

The compiler stack 20000 may include an adaptation layer 21000, a compute library 22000, a front-end compiler 23000, a back-end compiler 24000, and a runtime driver 25000.

The adaptation layer 21000 may be a layer in contact with the DL framework 10000. The adaptation layer 21000 may quantize a neural network model of a user generated by the DL framework 10000 and modify graphs. In addition, the adaptation layer 21000 may convert a type of model into a required type.

The front-end compiler 23000 may convert various neural network models and graphs transferred from the adaptation layer 21000 into a constant intermediate representation (IR). The converted IR may be a preset representation that is easy to handle later by the back-end compiler 24000.

The optimization that can be done in advance in the graph level may be performed on such an IR of the front-end compiler 23000. In addition, the front-end compiler 23000 may finally generate the IR through the task of converting it into a layout optimized for hardware.

The back-end compiler 24000 optimizes the IR converted by the front-end compiler 23000 and converts it into a binary file, enabling it to be used by the runtime driver. The back-end compiler 24000 may generate an optimized code by dividing a job at a scale that fits the details of hardware.

The compute library 22000 may store template operations designed in a form suitable for hardware among various operations. The compute library 22000 provides the back-end compiler 24000 with multiple template operations required by hardware, allowing the optimized code to be generated.

The runtime driver 25000 may continuously perform monitoring during driving, thereby making it possible to drive the neural network device in accordance with some embodiments. Specifically, it may be responsible for the execution of an interface of the neural network device.

The back-end module 30000 may include an ASIC (application-specific integrated circuit) 31000, an FPGA (field-programmable gate array) 32000, and a C-model 33000. The ASIC 31000 may refer to a hardware chip determined according to a predetermined design method. The FPGA 32000 may be a programmable hardware chip. The C-model 33000 may refer to a model implemented by simulating hardware on software.

The back-end module 30000 may perform various tasks and derive results by using the binary code generated through the compiler stack 20000.

Figure 25:
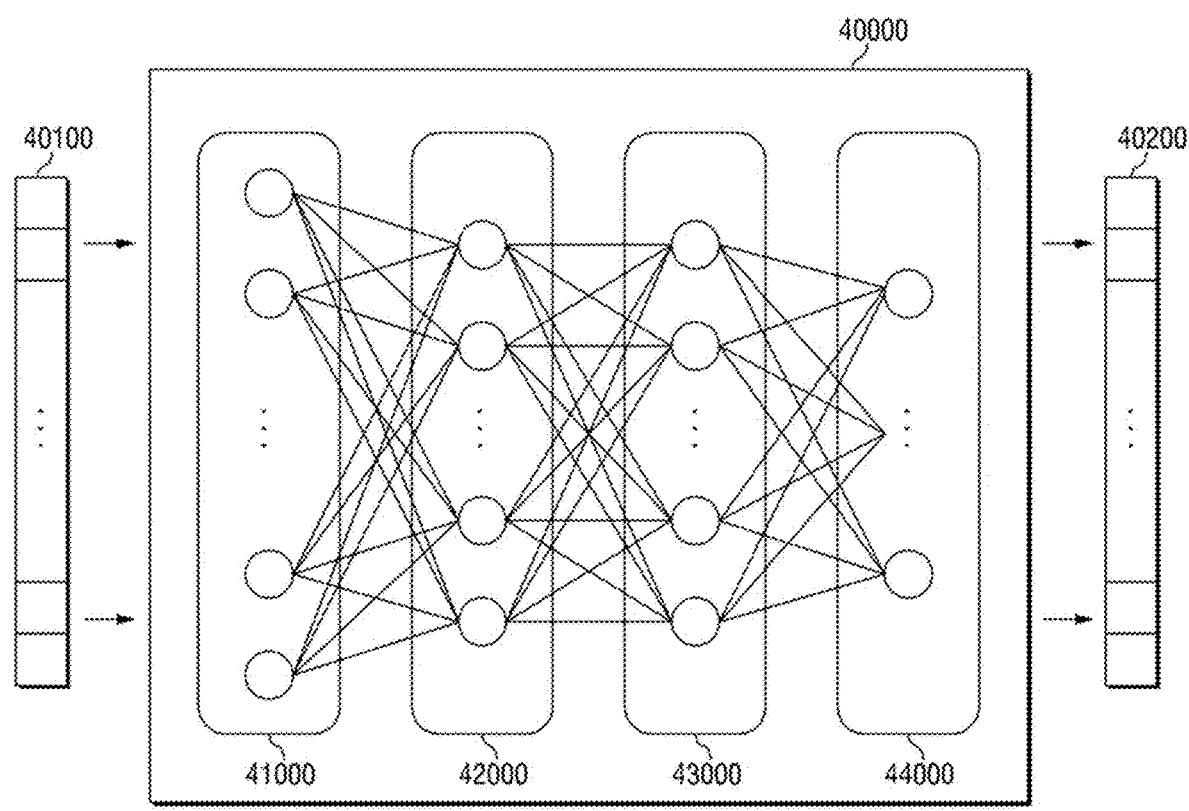
FIG. 25 is a conceptual diagram for illustrating deep learning calculations performed by a neural processing device in accordance with some embodiments of the disclosure.

FIG. 25 is a conceptual diagram for illustrating deep learning calculations performed by a neural processing device in accordance with some embodiments.

Referring to FIG. 25, an artificial neural network model 40000 is one example of a machine learning model and is a statistical learning algorithm implemented based on the structure of a biological neural network or is a structure for executing the algorithm, in machine learning technology and cognitive science.

The artificial neural network model 40000 may represent a machine learning model having an ability to solve problems by learning to reduce the error between an accurate output corresponding to a particular input and an inferred output by repeatedly adjusting the weight of the synapse by nodes. Nodes are artificial neurons that have formed a network by combining synapses, as in a biological neural network. For example, the artificial neural network model 40000 may include any probabilistic model, neural network model, etc., used in artificial intelligence learning methods such as machine learning and deep learning.

A neural processing device in accordance with some embodiments may implement the form of such an artificial neural network model 40000 and perform calculations. For example, the artificial neural network model 40000 may receive an input image and may output information on at least a part of an object included in the input image.

The artificial neural network model 40000 may be implemented by a multilayer perceptron (MLP) including multi-layer nodes and connections between them. An artificial neural network model 40000 in accordance with the embodiment may be implemented using one of various artificial neural network model structures including the MLP. As shown in FIG. 25, the artificial neural network model 40000 includes an input layer 41000 that receives input signals or data 40100 from the outside, an output layer 44000 that outputs output signals or data 40200 corresponding to the input data, and n (where n is a positive integer) hidden layers 42000 to 43000 that are located between the input layer 41000 and the output layer 44000 and that receive a signal from the input layer 41000, extract characteristics, and forward them to the output layer 44000. Here, the output layer 44000 receives signals from the hidden layers 42000 to 43000 and outputs them to the outside.

The learning methods of the artificial neural network model 40000 include a supervised learning method for training to be optimized to solve a problem by the input of supervisory signals (correct answers), and an unsupervised learning method that does not require supervisory signals.

The neural processing device may directly generate training data, through simulations, for training the artificial neural network model 40000. In this way, by matching a plurality of input variables and a plurality of output variables corresponding thereto with the input layer 41000 and the output layer 44000 of the artificial neural network model 40000, respectively, and adjusting the synaptic values between the nodes included in the input layer 41000, the hidden layers 42000 to 43000, and the output layer 44000, training may be made to enable a correct output corresponding to a particular input to be extracted. Through such a training phase, it is possible to identify the characteristics hidden in the input variables of the artificial neural network model 40000, and to adjust synaptic values (or weights) between the nodes of the artificial neural network model 40000 so that an error between an output variable calculated based on an input variable and a target output is reduced.

Figure 26:
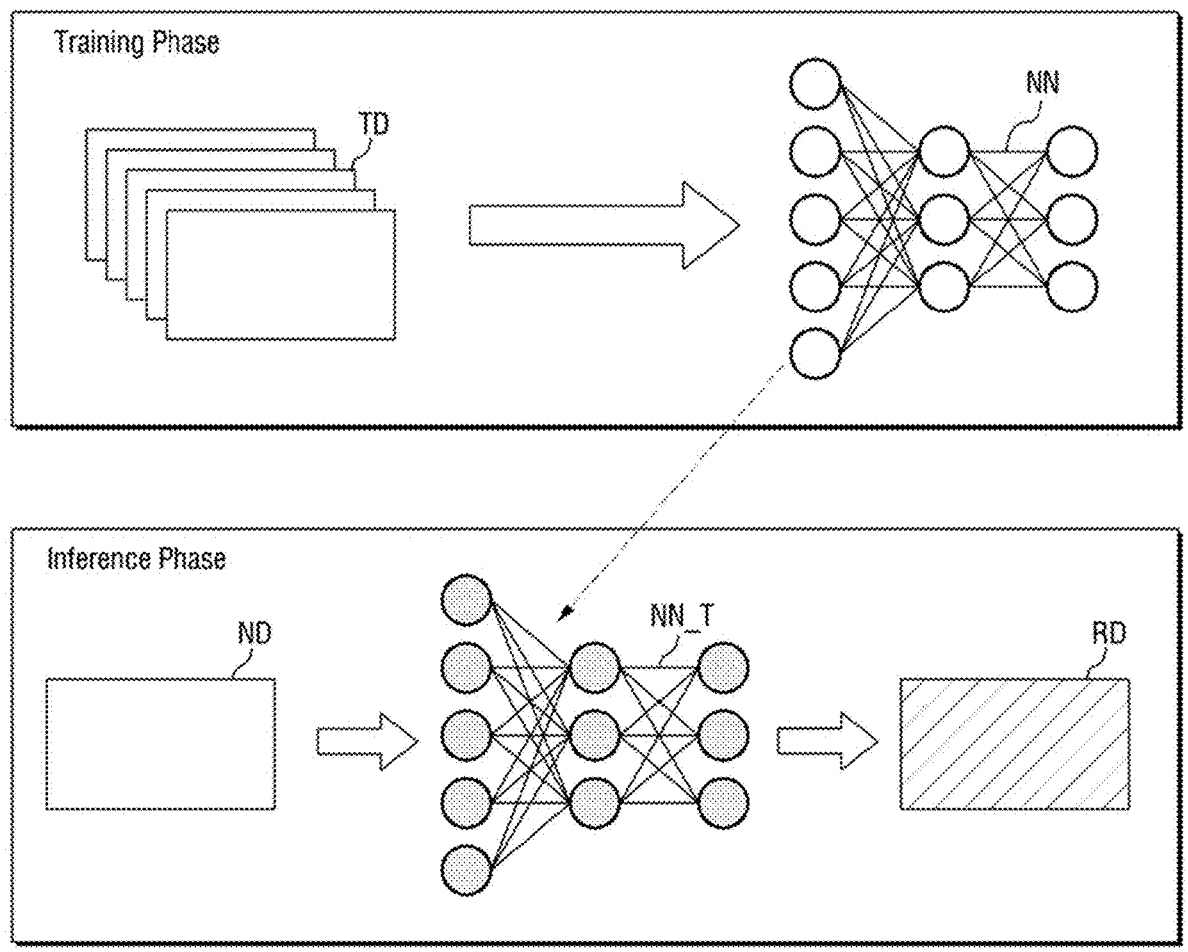
FIG. 26 is a conceptual diagram for illustrating training and inference operations of a neural network of a neural processing device in accordance with some embodiments of the disclosure.

FIG. 26 is a conceptual diagram for illustrating training and inference operations of a neural network of a neural processing device in accordance with some embodiments.

Referring to FIG. 26, the training phase may be subjected to a process in which a large number of pieces of training data TD are passed forward to the artificial neural network model NN and are passed backward again. Through this, the weights and biases of each node of the artificial neural network model NN are tuned, and training may be performed so that more and more accurate results can be derived. Through the training phase, the artificial neural network model NN may be converted into a trained neural network model NN_T.

In the inference phase, new data ND may be inputted into the trained neural network model NN_T again. The trained neural network model NN_T may derive result data RD through the weights and biases that have already been used in the training, with the new data ND as input. For such result data RD, what training data TD were used in training and how many pieces of training data TD were used in the training phase may be important.

The embodiment can process data through operations frequently used in deep-learning tasks by providing a simple logic to the local memory load unit 111a that performs common load operations. Through this, the efficiency of operation task can be improved, and the efficiency of data storage can also be greatly increased through the unpack operation. Furthermore, the operation efficiency of the processing unit can also be improved through the unpack operation.

Hereinafter, a method for loading data of a neural processing device in accordance with some embodiments of the disclosure will be described with reference to FIGS. 13A, 14, 17, and 27 to 29. Any description overlapping with the embodiments described above will be omitted or simplified.

Figure 27:
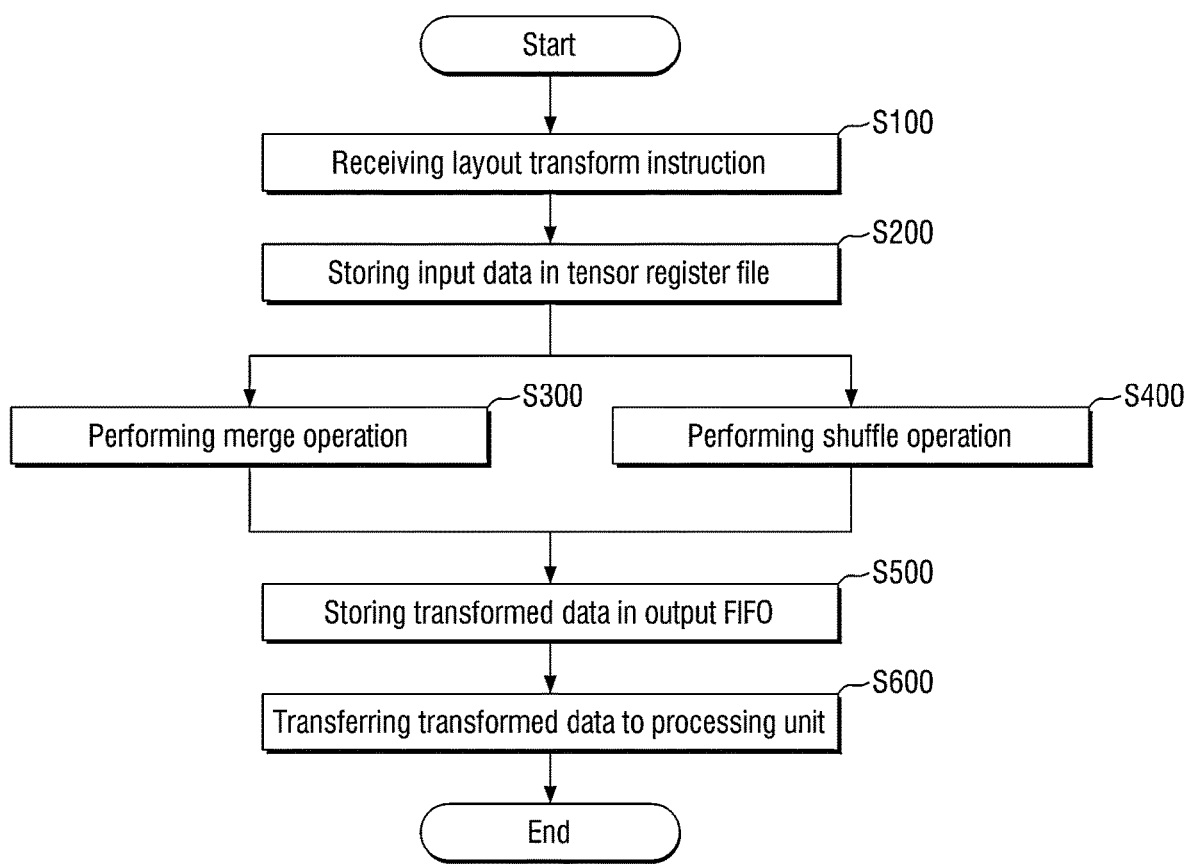
FIG. 27 is a flowchart for illustrating a method for loading data of a neural processing device in accordance with some embodiments of the disclosure.
Figure 28:
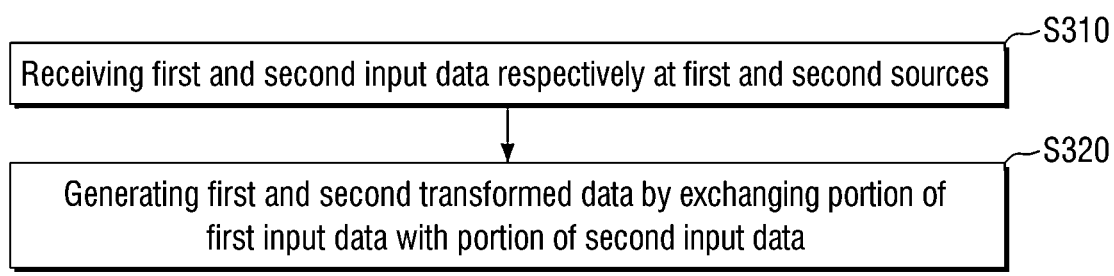
FIG. 28 is a flowchart for illustrating in detail the performing the merge operation of FIG. 27.
Figure 29:
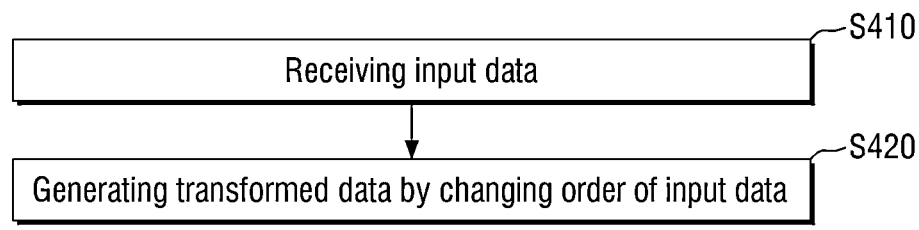
FIG. 29 is a flowchart for illustrating in detail the performing the shuffle operation of FIG. 27.

FIG. 27 is a flowchart for illustrating a method for loading data of a neural processing device in accordance with some embodiments of the disclosure, and FIG. 28 is a flowchart for illustrating in detail the performing the merge operation of FIG. 27. FIG. 29 is a flowchart for illustrating in detail the performing the shuffle operation of FIG. 27.

Referring to FIG. 27, a neural processing device may receive a layout transform instruction at S100.

Specifically, referring to FIG. 13A, the target decision module Tdm may receive an instruction. At this time, the instruction may be a layout transform instruction. The layout transform instruction may instruct a merge operation or a shuffle operation.

Referring again to FIG. 27, the neural processing device may store input data in a tensor register file at S200.

Specifically, referring to FIG. 13A, the tensor register file Trf may receive the input data from the target decision module Tdm by the layout transform instruction. The tensor register file Trf may receive and temporarily store the input data.

Referring again to FIG. 27, the neural processing device may perform a merge operation at S300.

In detail, referring to FIG. 28, first and second sources may receive first and second input data, respectively at S310.

Specifically, referring to FIGS. 13A and 14, when the transformation logic TL performs a merge operation, the input data may include first input data Ds1 and second input data Ds2. That is, the transformation logic TL may perform the merge operation with two pieces of input data. The first input data Ds1 may be inputted to the first source Src0, and the second input data Ds2 may be inputted to the second source Src1.

Referring again to FIG. 28, the neural processing device may generate first and second transformed data by exchanging at least one portion of the first input data with at least one portion of the second input data at S320.

Specifically, referring to FIGS. 13A and 14, the transformation logic TL may exchange the positions of the (1_2)th granule Dg12 and the (2_1)th granule Dg21 with each other and generate the first transformed data Ds1t and the second transformed data Ds2t. Accordingly, the first transformed data Ds1t may include the (1_1)th granule Dg11 and the (2_1)th granule Dg21. The second transformed data Ds2t may include the (1_2)th granule Dg12 and the (2_2)th granule Dg22.

Referring again to FIG. 27, the neural processing device may perform a shuffle operation at S400. Steps S300 and S400 may be performed alternatively to each other.

In detail, referring to FIG. 29, the neural processing device may receive the input data at S410.

Specifically, referring to FIGS. 13A and 17, when the transformation logic TL performs a shuffle operation, the input data may include only first shuffle input data sDs1, i.e., one piece of input data. That is, the transformation logic TL may perform the shuffle operation through one input data. The first shuffle input data sDs1 may be inputted to the first source Src0.

Referring again to FIG. 29, the neural processing device may generate transformed data by changing order of input data at S420.

Specifically, referring to FIGS. 13A and 17, the transformation logic TL may exchange the order of data granules. At this time, the transformation logic TL may divide a front part and a rear part based on the point that is a half point of total size of the first shuffle input data sDs1, and sequentially mix the granules of the front part and the rear part, thereby generating a first shuffle transformed data sDs1t. In other words, a first data granule of the front part, a first granule of the rear part, a second granule of the front part, and a second granule of the rear part may become four granules in sequence at the front of the first shuffle transformed data sDs1t. The rear part of the first shuffle transformed data sDs1t may also be arranged in the same way.

Referring again to FIG. 29, the neural processing device may store the transformed data in the output FIFO at S500.

Specifically, referring to FIG. 13A, the tensor register file Trf may receive the transformed data from the transformation logic TL. The tensor register file Trf may temporarily store the received transformed data. The tensor register file Trf may transmit the transformed data to the output FIFO OF. The output FIFO OF may receive and store the transformed data via the tensor register file Trf when the layout transform instruction is received at the target decision module Tdm.

Referring again to FIG. 29, the neural processing device may transfer the transformed data to the processing unit at S600.

Specifically, referring to FIG. 13A, the output FIFO OF may send the transformed data to the processing unit 160. At this time, the output FIFO OF may tile the transformed data into data granules of a certain size and transmit them to the processing unit 160 at the same time. In this case, the output FIFO OF may include a plurality of FIFOs, and the number of FIFOs may be equal to the number of entries in the tensor register file Trf. In each FIFO of the output FIFO OF, the transformed data may be tiled in granules of a certain size and stored, and may each be transmitted to the processing unit 160 at the same time.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the disclosure.

What is claimed is:

1. A neural core comprising:
   a processing unit configured to perform operations;
   an L0 memory configured to store input data, wherein the input data comprises a plurality of parts and a number of data granules of each of the plurality of parts is identical to each other; and
   a load/store unit (LSU) configured to perform a load task and a store task of data between the processing unit and the L0 memory,
   wherein the LSU comprises a local memory load unit configured to transmit the input data in the L0 memory to the processing unit, and
   the local memory load unit configured to
   retrieve the input data in the L0 memory,
   transform an order of data granules of the input data based on an instruction and thereby generate transformed data, and
   transmit the transformed data to the processing unit,
   wherein the instruction is a shuffle operation instruction that generates the transformed data in which the order of data granules of the input data is changed by sequentially and alternately arranging the data granules of each of the plurality of parts.

2. The neural core of claim 1, wherein the input data comprise first to j-th data granules of same size each other, and the transformed data comprises first to j-th data granules of same size each other,
   the processing unit receives the i input data simultaneously, and
   said j is an integer multiple of said i.

3. The neural core of claim 1, wherein the input data has a size of an even multiple of one of the data granules.

4. The neural core of claim 3, wherein the input data is i times larger than one of the data granules at most,
   the processing unit receives i input data simultaneously, and
   said i is a natural number.

5. The neural core of claim 1, wherein the local memory load unit comprises:
   a target decision module configured to decode the instruction and identify the input data within the L0 memory,
   a transformation logic configured to perform the shuffle operation based on the instruction, and
   an output first in first out (FIFO) configured to transmit the transformed data to the processing unit based on the instruction.

6. The neural core of claim 5, wherein the local memory load unit further comprises a tensor register file configured to receive the input data from the target decision module, provide the input data to the transformation logic, and receive the transformed data from the transformation logic.

7. The neural core of claim 6,
   wherein the tensor register file has i entries,
   a number of FIFOs of the output FIFO is i, and
   said i is a natural number.

8. The neural core of claim 1, wherein the instruction comprises a layout transform instruction for transforming a layout of the input data.

9. A neural processing device comprising:
   at least one neural processor;
   a shared memory shared by the at least one neural processor; and
   a global interconnection configured to transmit data between the at least one neural processor and the shared memory,
   wherein each of the at least one neural processor comprises:
   at least one neural core; and
   an L1 shared memory shared by the at least one neural core,
   wherein the at least one neural core comprises:
   a processing unit configured to perform operations;
   an LSU configured to transmit input data to the processing unit, wherein the input data comprises a plurality of parts and a number of data granules of each of the plurality of parts is identical to each other; and
   an L0 memory configured to store the input data, and
   wherein the LSU transforms an order of data granules of the input data based on an instruction, thereby generating transformed data, and transfers the transformed data to the processing unit,
   wherein the instruction is a shuffle operation instruction that generates the transformed data in which the order of data granules of the input data is changed by sequentially and alternately arranging the data granules of each of the plurality of parts.

10. The neural processing device of claim 9, wherein the input data comprise first to j-th data granules of same size each other, and the transformed data comprises first to j-th data granules of same size each other,
    the processing unit receives the i input data simultaneously, and
    said j is an integer multiple of said i.

11. A method for loading data of a neural processing device, comprising:
    receiving a layout transform instruction;
    storing input data in a tensor register file, wherein the input data comprises a plurality of parts and a number of data granules of each of the plurality of parts is identical to each other;
    transforming an order of data granules of the input data based on an instruction, thereby generating transformed data, wherein the instruction is a shuffle operation instruction that generates the transformed data in which the order of data granules of the input data is changed by sequentially and alternately arranging the data granules of each of the plurality of parts;

storing the transformed data in an output FIFO; and
transferring the transformed data to a processing unit.

12. The method for loading data of the neural processing device of claim 11, further comprising:
storing the transformed data in the tensor register file after generating the transformed data; and
transmitting the transformed data stored in the tensor register file to the output FIFO.

* * * * *